DEPTH REGULATING DEVICE FOR SUBFLOATING BODIES

Filed Jan. 6, 1942 12 Sheets-Sheet 1

INVENTORS
CHARLES MOON
RAYMOND L. DRISCOLL
BY [signature]
ATTORNEY

INVENTORS
CHARLES MOON
RAYMOND L. DRISCOLL
BY [signature]
ATTORNEY

DEPTH REGULATING DEVICE FOR SUBFLOATING BODIES

Filed Jan. 6, 1942 12 Sheets-Sheet 3

INVENTORS
CHARLES MOON
RAYMOND L. DRISCOLL
BY [signature]
ATTORNEY

INVENTORS
CHARLES MOON
RAYMOND L. DRISCOLL
BY K. C. Caldwell
ATTORNEY

DEPTH REGULATING DEVICE FOR SUBFLOATING BODIES

Filed Jan. 6, 1942 12 Sheets-Sheet 5

INVENTORS
CHARLES MOON
RAYMOND L. DRISCOLL
BY K. C. Caldwell
ATTORNEY

Dec. 12, 1961 C. MOON ET AL 3,012,502

DEPTH REGULATING DEVICE FOR SUBFLOATING BODIES

Filed Jan. 6, 1942 12 Sheets-Sheet 6

INVENTORS
CHARLES MOON
RAYMOND L. DRISCOLL

BY [signature]
ATTORNEY

Dec. 12, 1961 C. MOON ET AL 3,012,502

DEPTH REGULATING DEVICE FOR SUBFLOATING BODIES

Filed Jan. 6, 1942 12 Sheets-Sheet 7

INVENTORS
CHARLES MOON
RAYMOND L. DRISCOLL
BY [signature]
ATTORNEY

DEPTH REGULATING DEVICE FOR SUBFLOATING BODIES

INVENTORS
CHARLES MOON
RAYMOND L DRISCOLL
BY [signature]
ATTORNEY

DEPTH REGULATING DEVICE FOR SUBFLOATING BODIES

Filed Jan. 6, 1942 12 Sheets-Sheet 9

INVENTORS.
CHARLES MOON
RAYMOND L. DRISCOLL
BY
ATTORNEY

INVENTORS
CHARLES MOON
RAYMOND L. DRISCOLL
BY [signature]
ATTORNEY

Dec. 12, 1961 C. MOON ET AL 3,012,502

DEPTH REGULATING DEVICE FOR SUBFLOATING BODIES

Filed Jan. 6, 1942 12 Sheets-Sheet 11

INVENTORS
CHARLES MOON
RAYMOND L. DRISCOLL

BY K. Caldwell
ATTORNEY

INVENTORS
CHARLES MOON
RAYMOND L. DRISCOLL
BY K. C. Caldwell
ATTORNEY

United States Patent Office 3,012,502
Patented Dec. 12, 1961

3,012,502

DEPTH REGULATING DEVICE FOR SUBFLOATING BODIES

Charles Moon and Raymond L. Driscoll,
Washington, D.C.

Filed Jan. 6, 1942, Ser. No. 425,718
21 Claims. (Cl. 102—14)
(Granted under Title 35, U.S. Code (1952), sec. 266)

This invention relates to improvements in automatic depth-regulating devices for freely subfloating bodies. More specifically the invention relates to a depth regulating device adapted to be attached to or incorporated within a subfloating body such as a submarine mine or the like in which the device, after having been launched, within a body of water is caused to oscillate by electrical propulsion at a predetermined depth of submersion and the specific gravity thereof to be adjusted automatically to the specific gravity of the surrounding water.

It has been the general practice in devices hitherto proposed to effect an oscillating movement of the devices by means of changes in the specific gravity of the floating body in such a manner that the specific gravity becomes alternately greater and less than that of the surrounding water with each such oscillation. Certain other devices hitherto used for effecting such an oscillating movement of a subfloating body are adjusted to a specific gravity either greater or less than that of the surrounding water, as the case may be, and a screw propeller controlled by a hydrostat is employed for reversing the movement of the subfloating body caused by the unbalanced condition of the specific gravity thereof. Such devices consume a considerable amount of power for maintaining the movement and the sources of power proposed for this purpose require in general a rather complicated controlling mechanism and bring about various difficulties thereby reducing the reliability of service and of operation of the bodies.

The device of the present invention provides means for causing a subfloating body to oscillate by impulses received from a screw propeller during the time the body has passed beyond the upper and lower control levels of oscillation, in which the mean or specific density of the body is automatically adjusted to the mean or specific density of the surrounding water when the screw propeller has made a predetermined number of revolutions in one direction of rotation in excess of the number of revolutions in the other direction of rotation and in which the frequency of oscillation is reduced to a minimum as the specific density of the body is brought into equality with the specific density of the surrounding water. An arrangement is thus provided in which both the amplitude and frequency of oscillation and the drain on the source of power is reduced to a minimum thereby prolonging the period of time during which the body continues to oscillate before the source of power is exhausted.

It has been found that the density of water varies in accordance with the depth of the water from the surface thereof, the water increasing in density as the distance from the surface of the water is increased. It is thought that this increase in density is due, generally, to the effect of temperature of the water, the water near the surface usually being warmer than the water at a greater depth and, since the temperature of a body of water is continually changing as the result of tidal currents or changes in climatic conditions and differences in atmospheric temperature such, for example, as occurs between conditions of day and night, it has been found necessary to provide means for continually compensating for the changes which occur in the temperature of water from any of the above causes, and for changes in density due to the degree of salinity of the water in order that a subfloating body may be maintained in a state of oscillation about a predetermined depth of submersion within a body of water with a minimum consumption of energy required to maintain such oscillation.

One of the objects of the invention is the provision of new and improved means for controlling the oscillation of a subfloating body in which the specific density of the body is continuously maintained in equality with the specific density of the surrounding water.

Another of the objects is to provide means for applying impulses of opposite direction to a subfloating body at predetermined depths of immersion to cause the body to oscillate without changing the specific density of the body until a predetermined difference exists in the time during which the impulses of opposite directions are applied to the body and for thereafter bringing the specific gravity of the body into equality with the specific gravity of the surrounding water.

Another object is the provision of means for causing a subfloating body to oscillate continuously about a predetermined depth of submersion and maintain the specific gravity of the body at the specific gravity of the surrounding water.

Another object is the provision of new and improved means for causing a subfloating body to be continually submerged in close proximity to a predetermined depth of submersion of the body.

A further object is the provision of means for changing the buoyancy of a subfloating body from a negative to a positive value when the body is launched within a body of water and to set a propulsion mechanism in operation when the body has risen to a predetermined depth of submersion thereby to maintain the subfloating body in a continuous state of oscillation between predetermined limits of depth of submersion.

A still further object is to provide means settable at will for controlling the amplitude of oscillation of a subfloating body.

Still other objects, advantages, and improvements will be apparent from the following description taken in connection with the accompanying drawings, of which:

Figure 1:
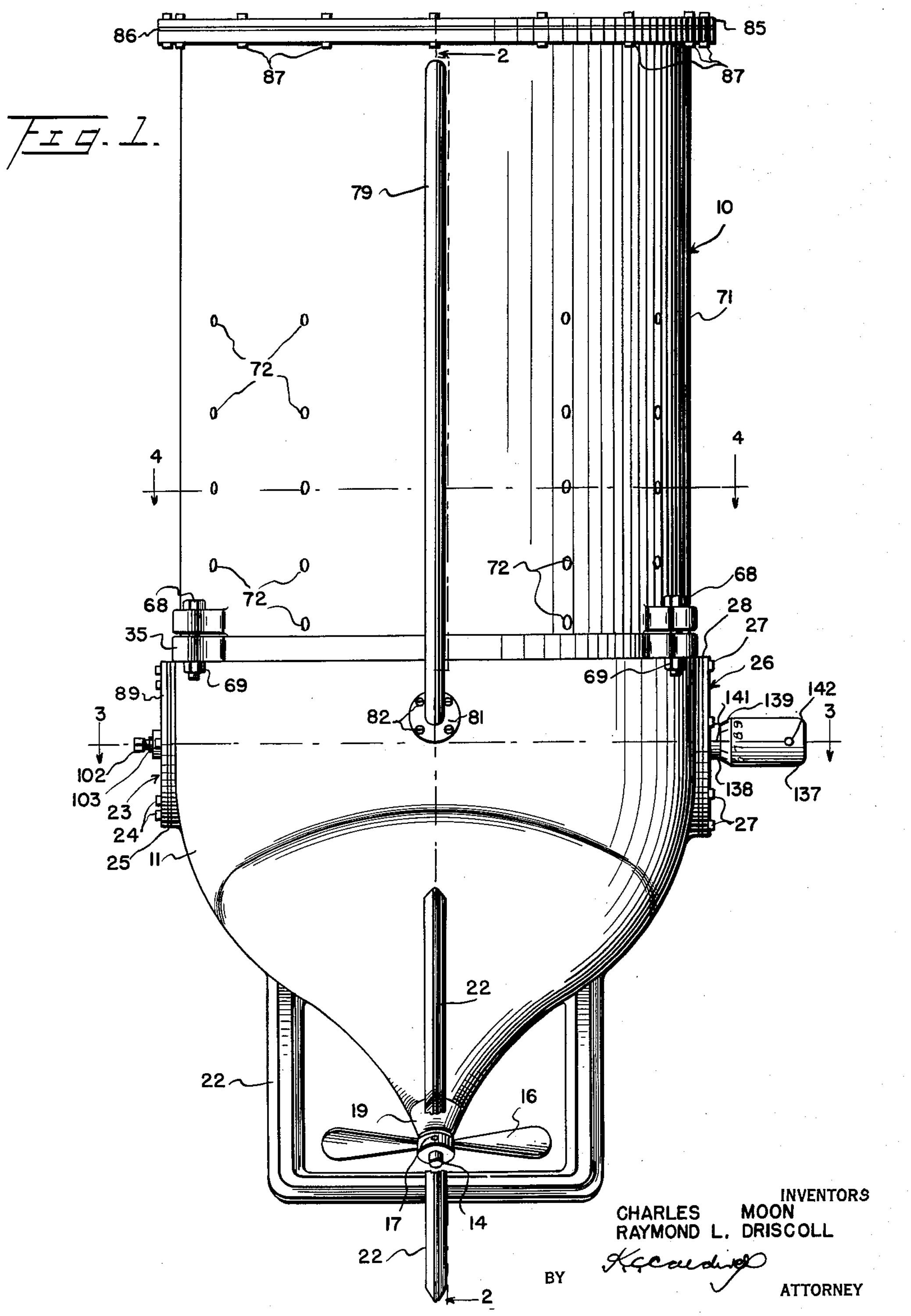
FIG. 1 is a view in elevation of a preferred form of the device.
Figures 12, 13, 14, 15:
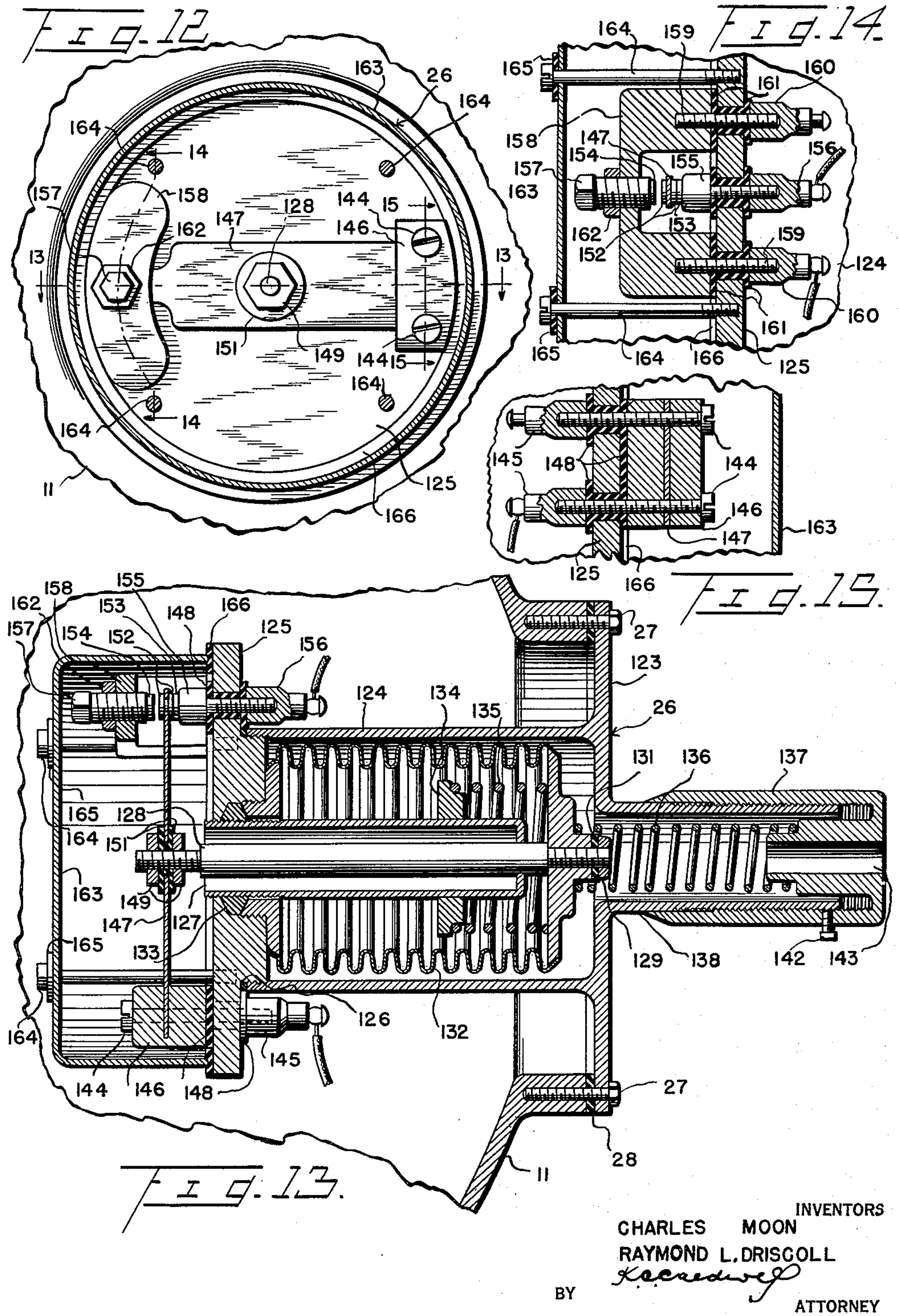
FIG. 12 is a view of the hydrostatically operated motor control device taken substantially along the line 12—12 of FIG. 3.
FIG. 13 is a view taken substantially along the line 13—13 of FIG. 12.
Figure 16:
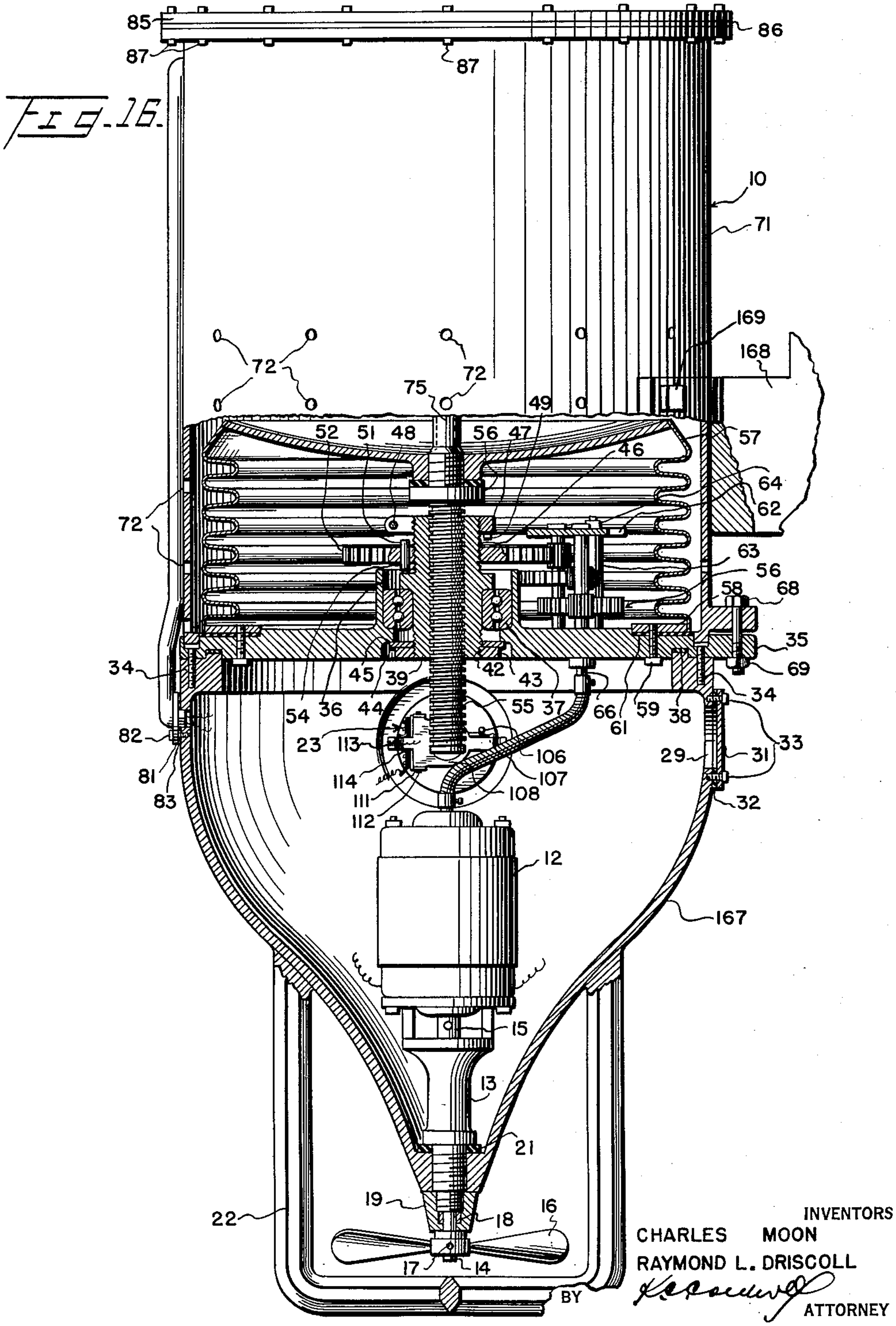
Figures 17, 18, 19:
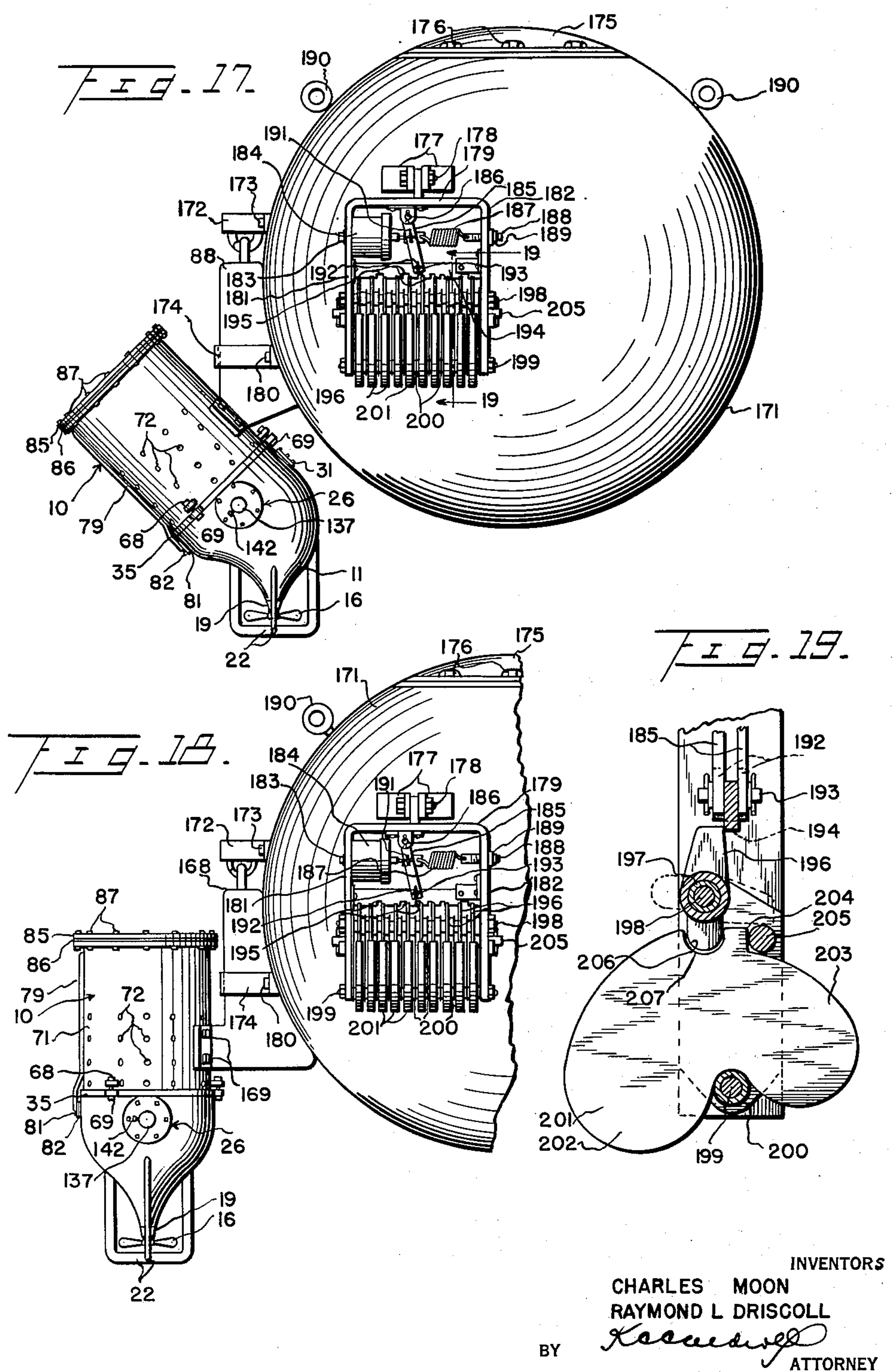
Figure 20:
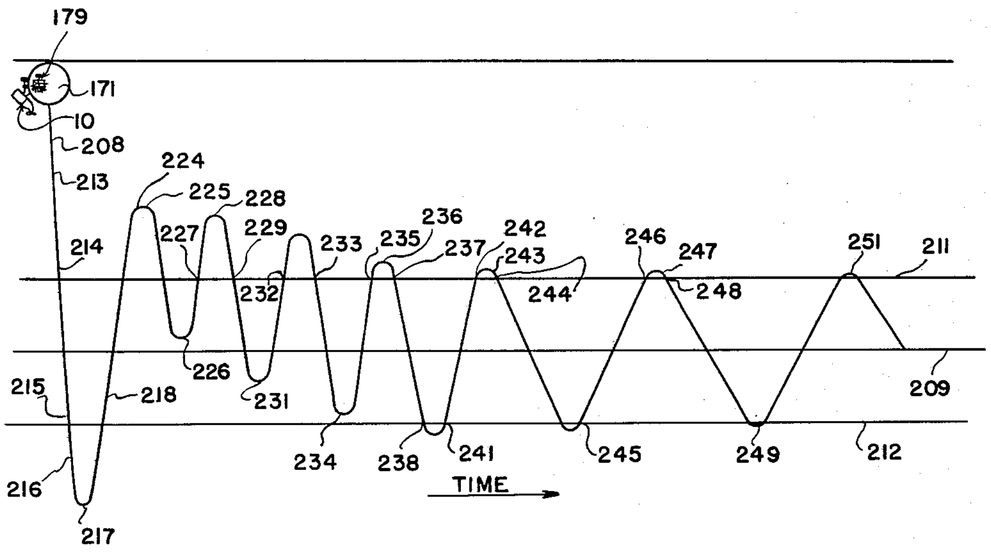
Figure 21:
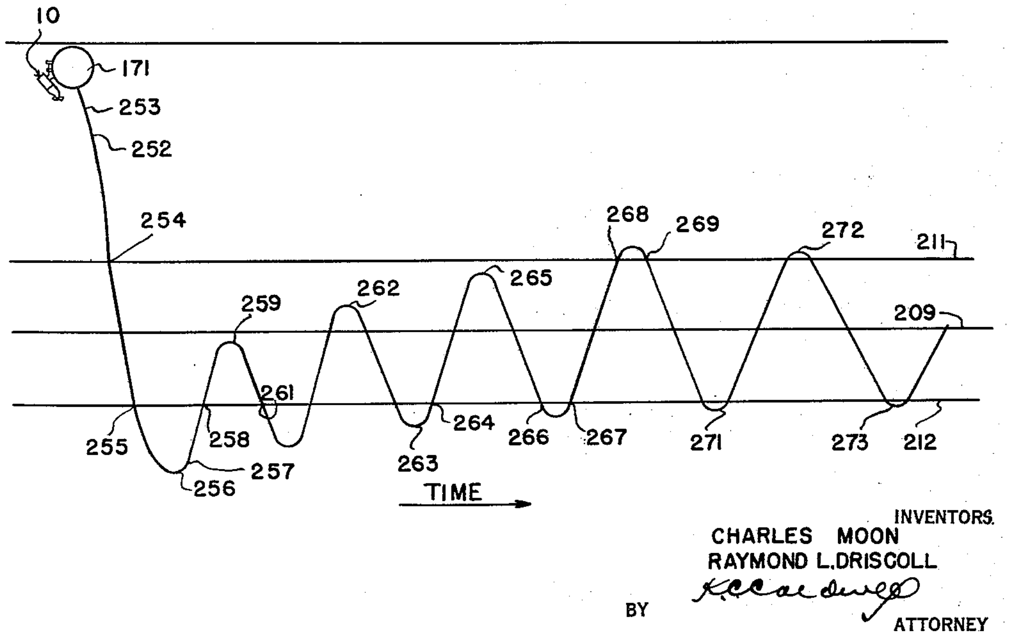
Figure 22:
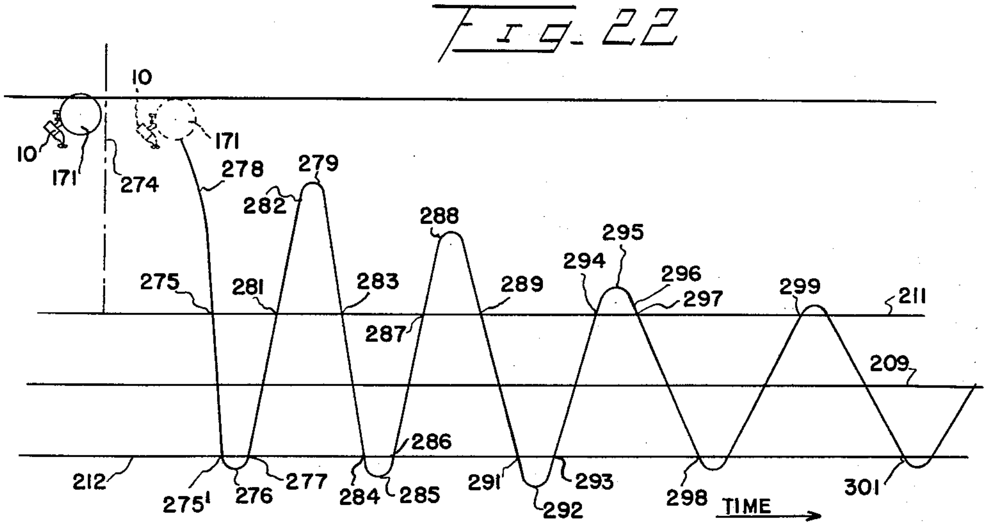
Figure 23:
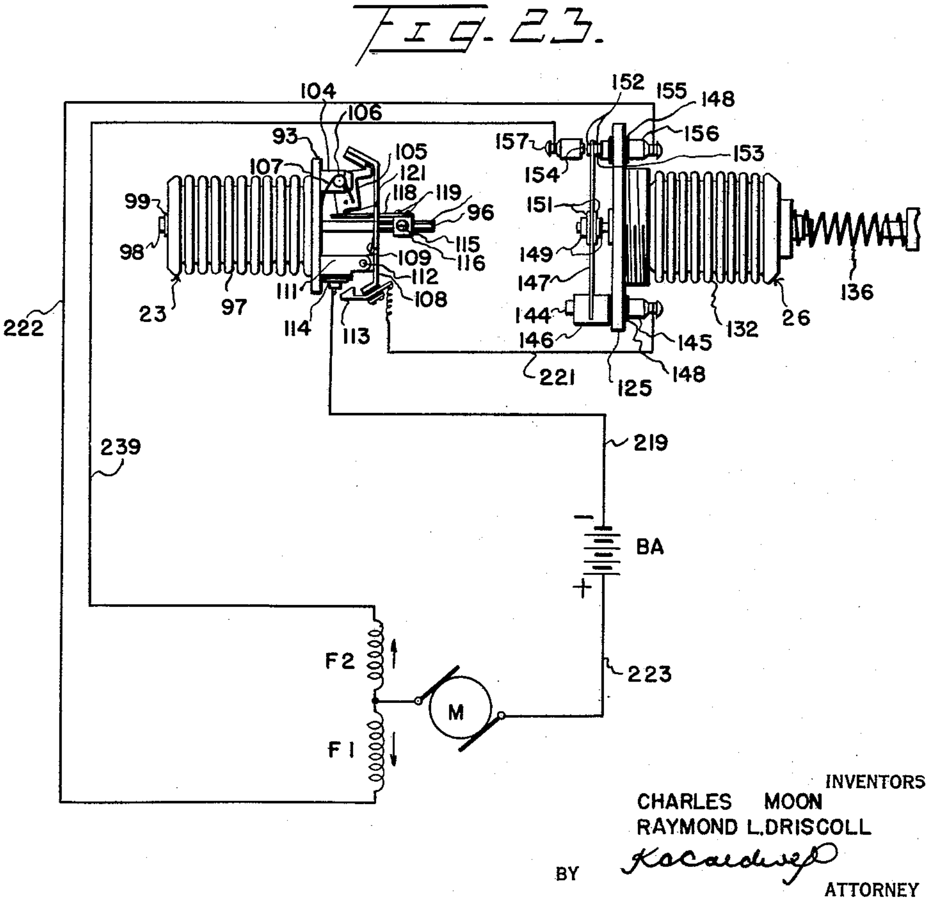
Figure 24:
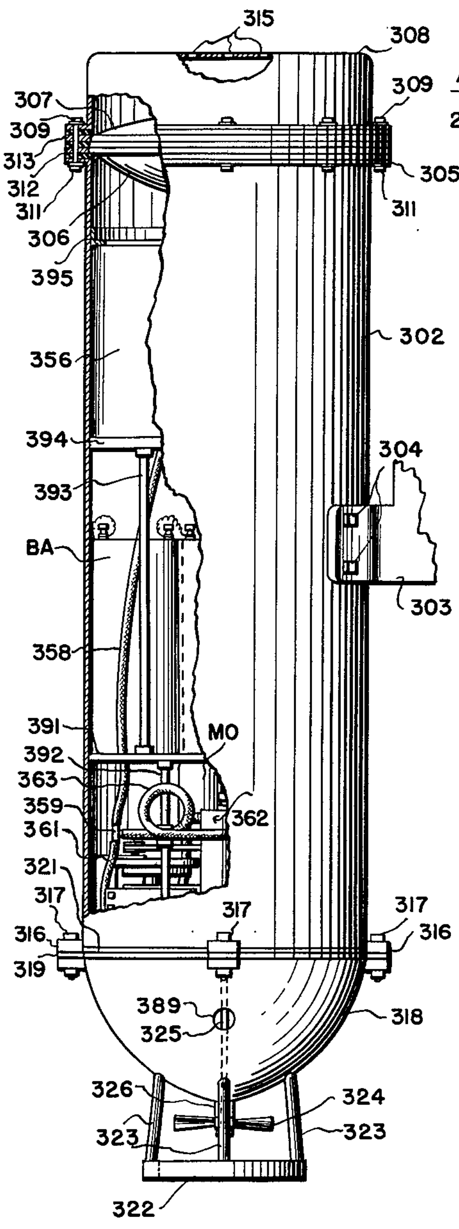
Figure 25:
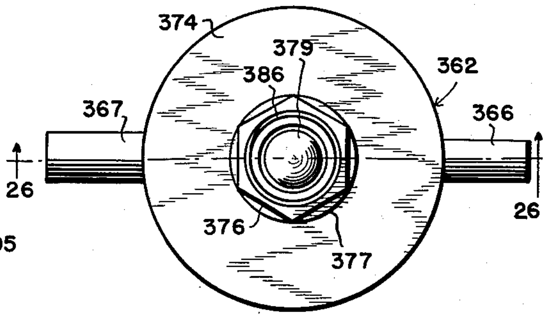
Figure 26:
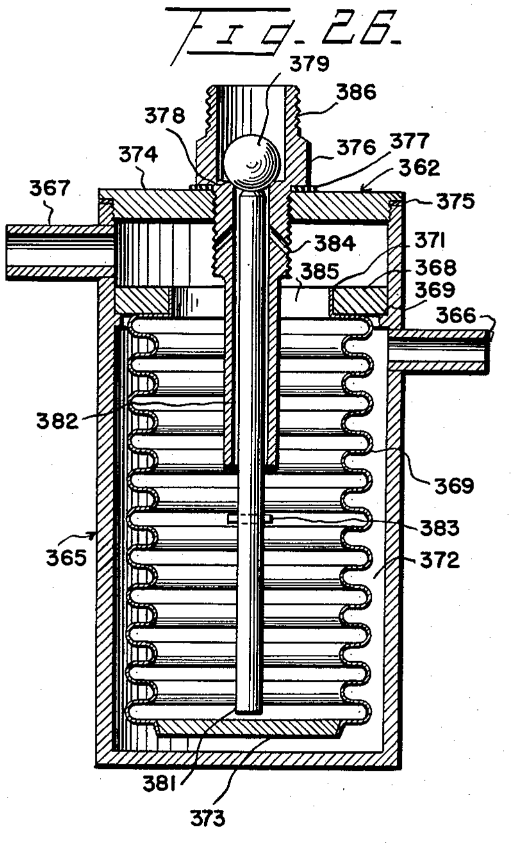
Figure 27:
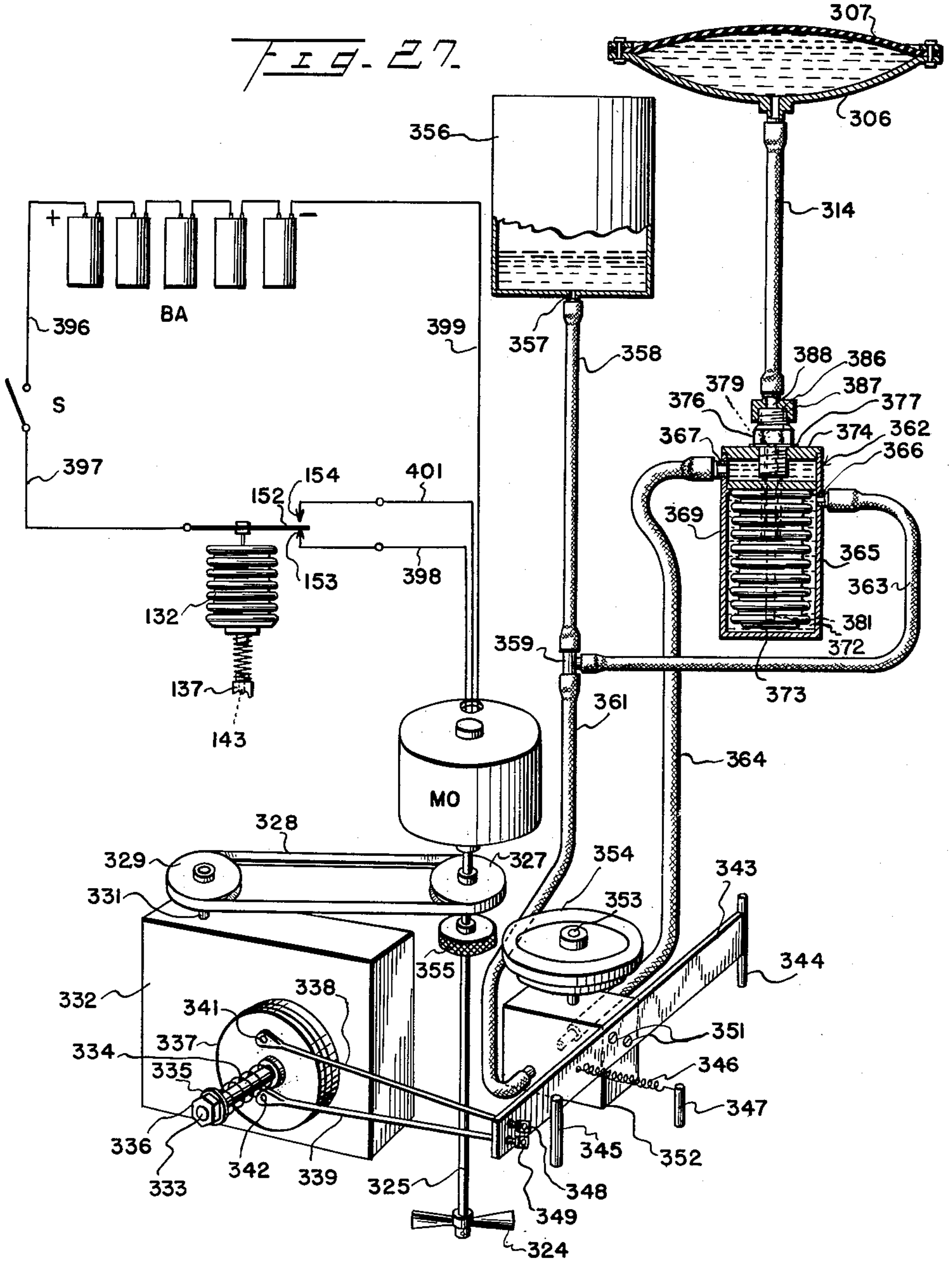

FIGS. 14 and 15 are detailed views in section taken along the line 14 and 15 respectively of FIG. 12;

FIG. 16 is a view partly in section and partly broken away of an alternative form of the device;

FIG. 17 is a view in elevation of the device of FIG. 1 operatively connected to a submarine mine provided with a weight dropping mechanism;

FIG. 18 is a view of the device of FIG. 16 operatively connected to a submarine mine such as illustrated in FIG. 17;

FIG. 19 is a view somewhat enlarged and partly broken away taken substantially along the line 19—19 of FIG. 17;

FIG. 20 illustrates diagrammatically the operation of the device when employed with the weight dropping mechanism of FIGS. 17 and 18;

FIG. 21 illustrates in diagrammatic form the operation of the device in which a weight dropping mechanism is not employed;

FIG. 22 is a diagram illustrating graphically the operation of the device in which a positive degree of buoyancy is initially applied thereto;

FIG. 23 illustrates in diagrammatic form a circuit arrangement suitable for use with the present invention;

FIG. 24 is a view in elevation and partly broken away of an alternative form of the device in accordance with FIG. 23;

FIG. 25 is a plan view of the control valve employed with the device of FIG. 24;

FIG. 26 is a sectional view in elevation of the valve of FIG. 25 taken along the line 26—26; and FIG. 27 is a diagrammatic view of an arrangement of the electrical circuits and depth controlling mechanism employed therewith suitable for use with the device of FIG. 24.

Figure 2:
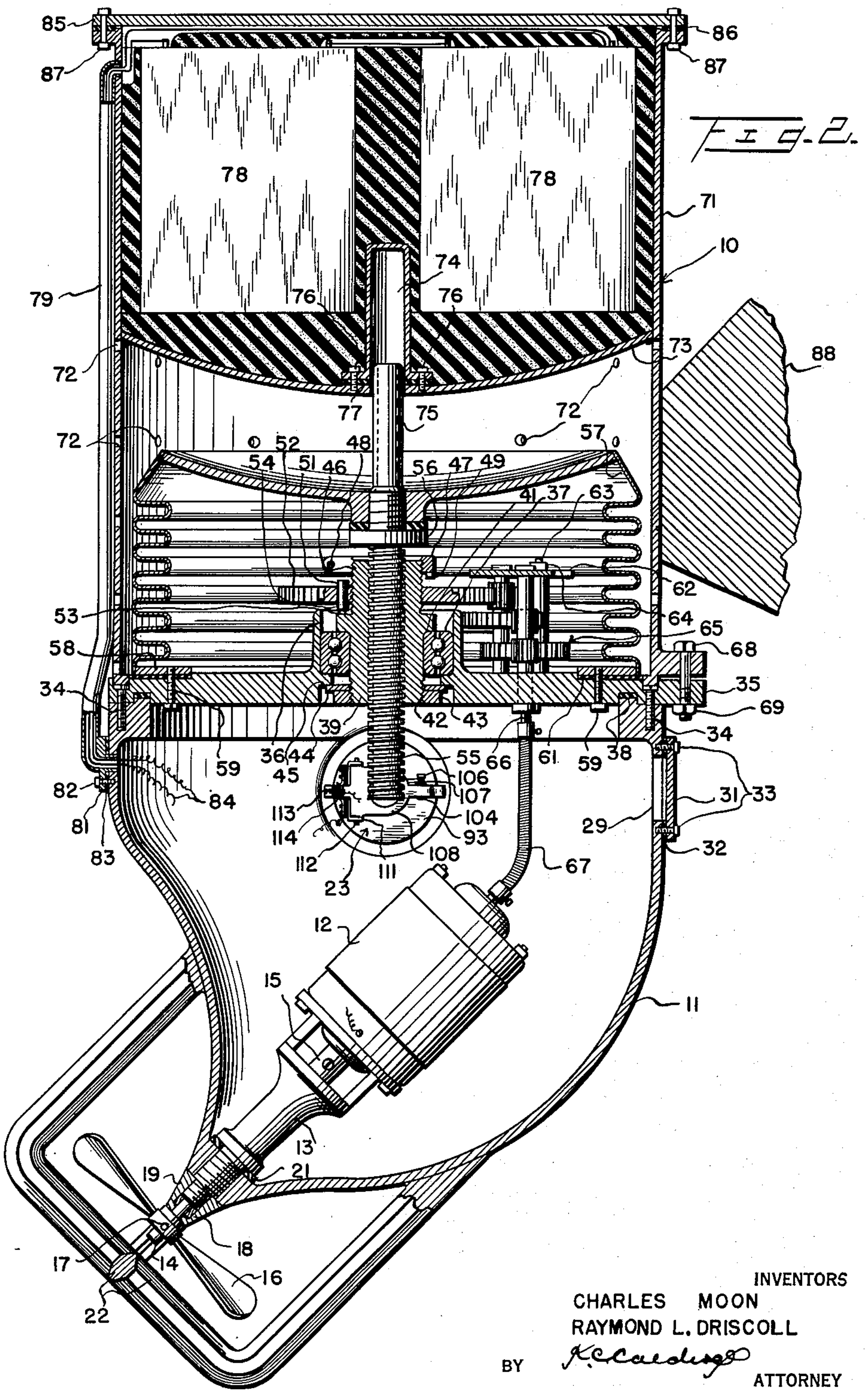
FIG. 2 is a view partly in section taken along the line 2—2 of FIG. 1.
Figure 3:
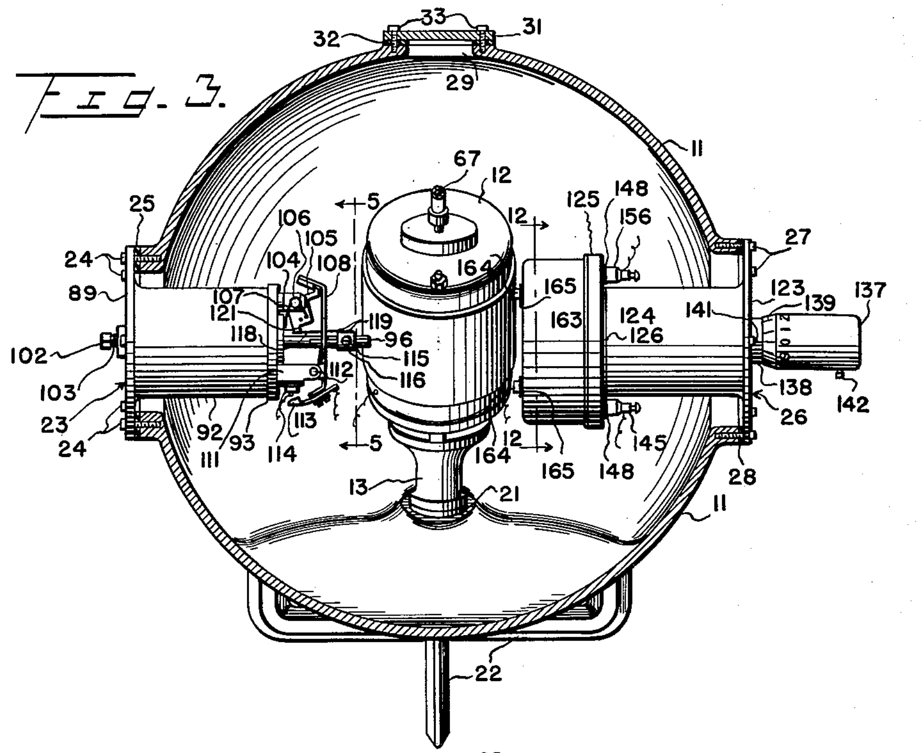
FIG. 3 is a view taken substantially along the line 3—3 of FIG. 1.
Figure 4:
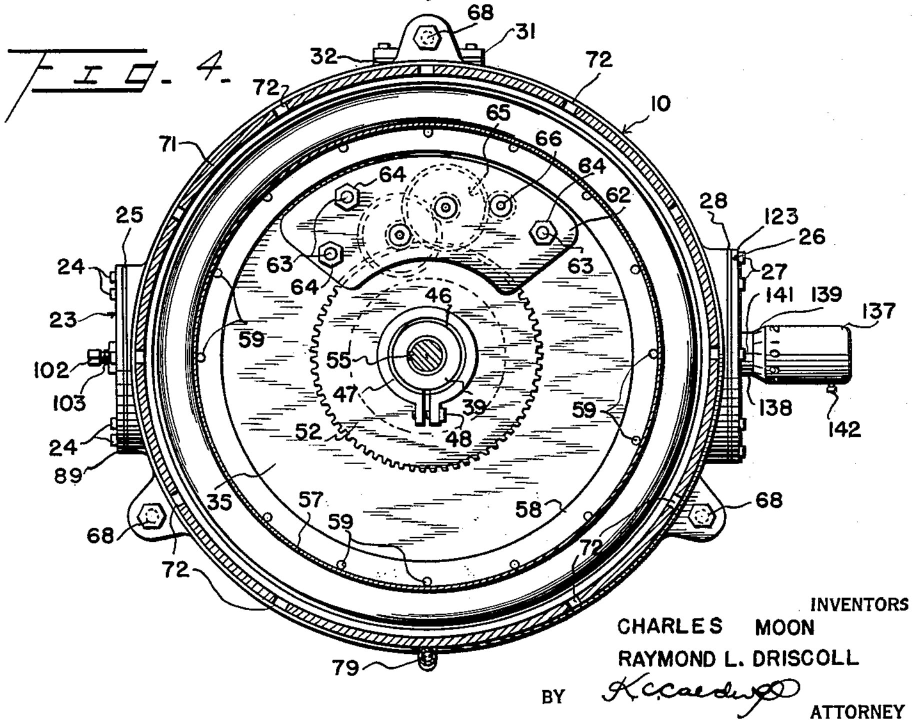
FIG. 4 is a view taken substantially along the line 4—4 of FIG. 1.
Figure 5:
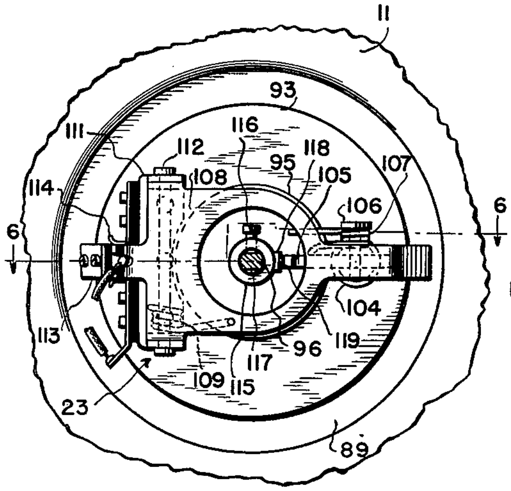
FIG. 5 is a plan view of the hydrostatically controlled starting switch suitable for use with the present invention with the switch in an unoperated condition.
Figure 7:
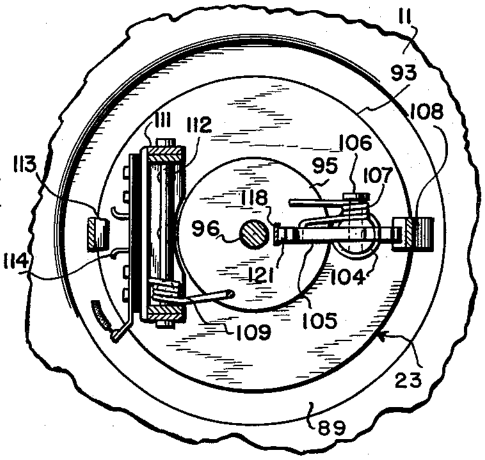
FIG. 7 is a view taken substantially along the line 7—7 of FIG. 6.

Referring first to the drawings on which like numerals of reference are employed to designate like parts throughout the several views, and more particularly to FIGS. 1 and 2 thereof on which is shown a depth regulating device indicated generally by the numeral 10 comprising a casing 11 within which is disposed a reversible electric motor 12 secured thereto as by the support 13 in threaded engagement with the casing. The motor is connected to a shaft 14 preferably passing through the support and connected to the motor as by the coupling 15. A propeller 16 is mounted on the shaft and secured thereto in any suitable manner as by the pin 17. A packing 18 is disposed about the shaft and secured to the casing as by the packing nut 19 whereby leakage or seepage of water about the shaft is prevented. A gasket 21 is provided between the support 13 and the casing 11 to insure a watertight connection therebetween. A guard 22 is secured to the casing 11 in any suitable manner as by brazing or welding the parts together thereby to protect the propeller and shaft from injury during the handling, transportation and planting of the device within a body of water.

The casing 11 is provided with an aperture within which is disposed a starting switch mechanism indicated generally at 23 secured to the casing as by the screws 24, a suitable gasket 25 being provided preferably between the starting switch mechanism and the casing to provide a watertight connection therebetween.

The casing 11 also supports a depth control device 26 secured thereto by the screws 27 in watertight relation as by the gasket 28. There is also provided an aperture 29 within the casing 11 sealed by the cover 31 held against the gasket 32 by the screws 33 whereby the mechanical connection between the motor and the buoyancy control mechanism may be established during the assembly of the device.

Secured to the casing 11 as by the screws 34 is a platform 35 having a recessed portion 36 within which is disposed the ball bearing 37, the platform being sealed to the casing by the gasket 38. Supported by the bearing 37 is a rotatable member 39 having a shoulder 41 adapted to engage the bearing 37 and a threaded portion 42 adapted to receive a nut 43 whereby the nut 43 coacts with the washer 44 adapted to engage a shoulder 45 and prevent substantial axial movement of the member 39. The member 39 is also provided with a threaded portion 46 to which is secured the adjusting member 47 maintained in a predetermined position by the clamping bolt 48, a stop pin 49 being provided for engagement with the complementary pin 51 mounted on the ring gear 52 in threaded engagement with the portion 46 of the member 39. Secured to the member 39 is a pin 53 arranged to engage the extending portion 54 of the pin 51 secured to the member 52 whereby the member 39 is moved forwardly or reversely, as the case may be, in accordance with the degree of movement of the ring gear after the ring gear has made a predetermined angular movement from an initial position with respect to the member 39.

The member 39 is also provided with a tapped hole within which is threaded the screw 55 having a shoulder 56 thereon by means of which the expansible bellows 57 is held in watertight engagement with the screw as by threading the upper portion of the bellows on the screw in the manner illustrated. The other end of the bellows is provided preferably with an annular member 58 whereby the bellows is maintained in sealed relation to the platform 35 as by the bolts 59 and gasket 61. The screw 55 is thus prevented from angular movement whereby the rotation of the member 39 in either direction causes the expansible bellows to be raised or lowered and thus vary the displacement of the depth controlling device within a body of water.

There is also provided a plate 62 supported by the studs 63 and nuts 64 having bearings for supporting a plurality of reduction gears indicated generally at 65 comprising a gear train in which the shaft 66 is required to make a predetermined number of revolutions for each revolution of the ring gear 52. The shaft 66 is operatively connected to the motor by the flexible shaft 67.

Secured to the casing 11 as by the bolts 68 and nuts 69 is a housing 71 having a plurality of apertures 72 therein for the admission of the water within the housing. Disposed within the housing and secured thereto in sealed relation in any suitable manner as by welding or brazing the parts together is a partition 73 having an aperture therein about which is disposed the guide member 74 adapted to receive and support the extended grooved portion 75 of the screw 55. The guide member is maintained in the assembled position in any suitable manner such as by the screws 76, a suitable gasket 77 being preferably provided to insure a watertight connection between the guide member and the partition.

A battery suitable for the purpose such as the battery 78 illustrated is arranged within the upper portion of the chamber 10 and insulated therefrom a yieldable pad or cushion of resilient material such, for example, as sponge rubber thereby to prevent injury to the battery as the device is handled, transported and planted within a body of water. A tubular member 79 is welded or otherwise secured to the housing 71 and provided with a flanged portion 81 adapted to be secured to the casing 11 as by the bolts 82 in watertight relation as by the gasket 83 whereby the electrical conductors 84 connected to the battery 78 are brought into the casing 11 for connection to the electric motor and control mechanism therefor.

A cover 85 and gasket 86 are employed to seal the upper end of the housing 71 and to maintain the same in sealed condition as by the bolts 87. The housing 10 is also provided with an arm or bracket 88 secured thereto for attachment to a submarine mine or other subfloating body.

Figure 6:
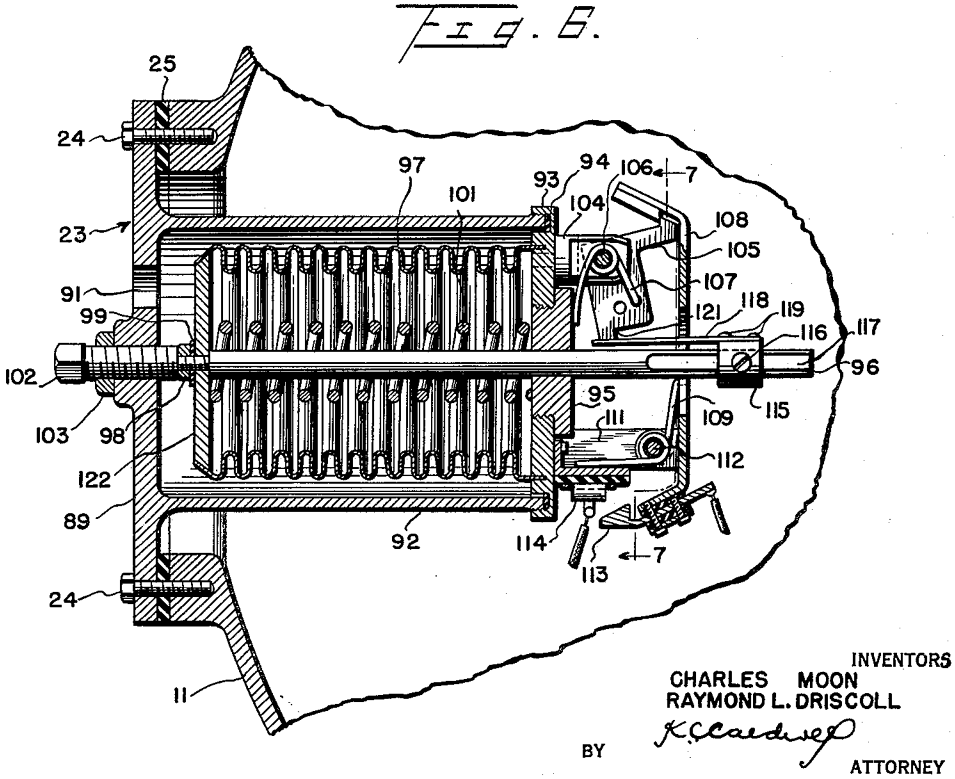
FIG. 6 is a view of the switch mechanism taken along the line 6—6 of FIG. 5.
Figures 8, 9, 10, 11:
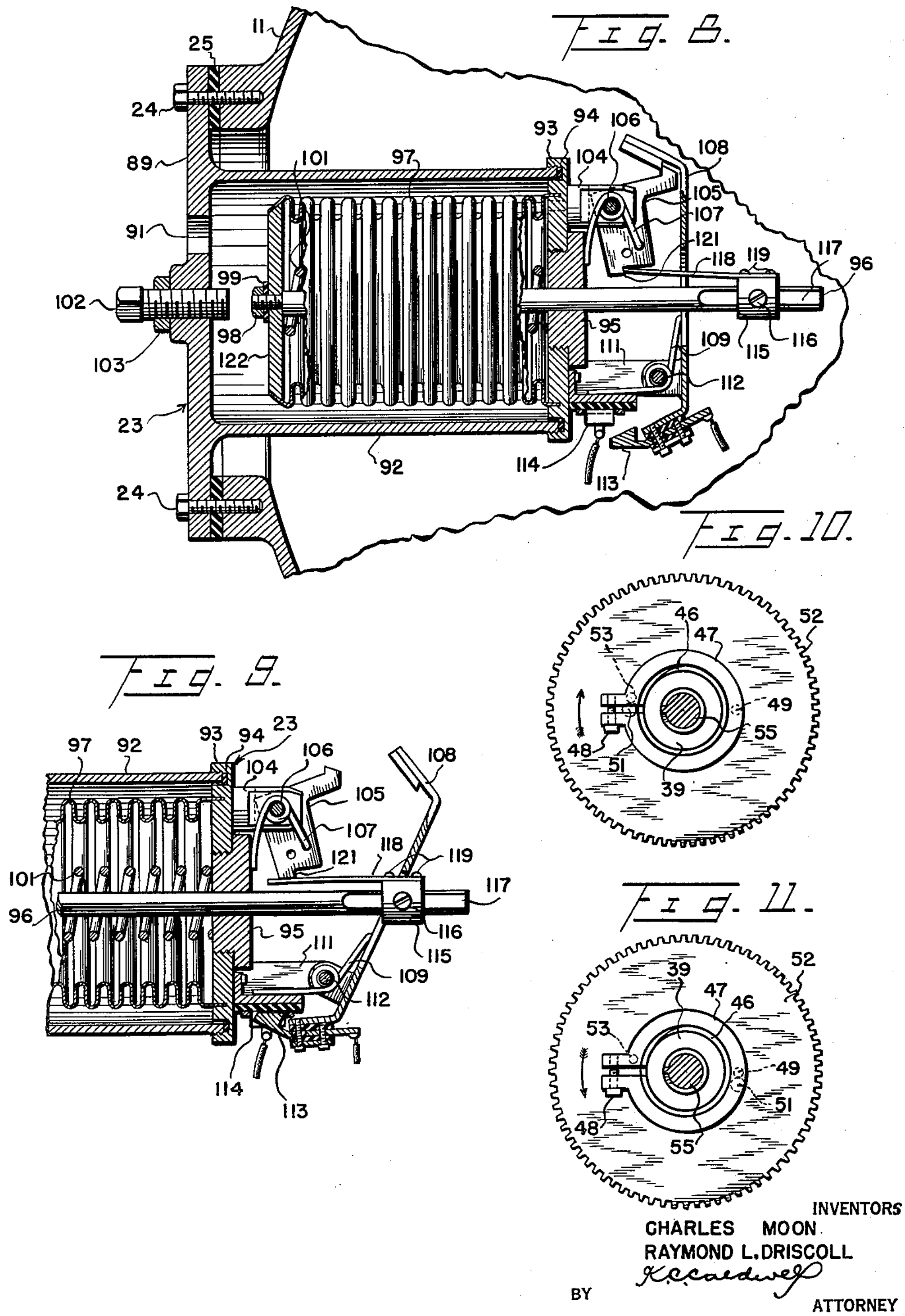
FIG. 8 is a view partly in section and partly broken away of the device of FIG. 6 showing the hydrostatic element in a retracted position.
FIG. 9 is a fragmentary view partly in section showing the switch mechanism in an operated condition.
FIGS. 10 and 11 are views partly in section showing a portion of the control mechanism for actuating the volume displacing device in opposite directions respectively.

Referring now to FIGS. 5 to 9 of the drawings on which are shown several views of the hydrostatically controlled starting switch, and more particularly to FIG. 6 thereof on which is shown the switch in an initial condition, it will be noted that the switch comprises, among other elements, a supporting member 89 secured to the casing 11 by the bolts 24 and having an aperture 91 therein for the admission of the water within the member. The member 89 includes a cylindrical portion 92 having a plate 93 secured at the end thereof as by threading the parts together, a gasket 94 being provided to prevent the seepage of water therebetween. The plate 94 has a threaded portion 95 within which is slideably supported the shaft 96 secured at one end thereof to an expansible bellows 97 as by the nut 98 and washer 99 which may be of suitable yieldable material thereby to make a watertight joint therebetween. The other end of the expansible bellows is secured to the plate 93 in any suitable manner as by soldering or brazing the parts together whereby the entrance of water within the bellows is prevented. A spring 101 is employed to maintain the bellows against a screw stop member 102 threaded into the supporting member 89 and maintained in the adjusted position by the nut 103.

Secured to the plate 94 is a support 104 having a latch member 105 pivotally mounted thereon at 106 and urged by the spring 107 into engagement with the arm 108, the spring 109 being employed to urge the arm 108 outwardly against the latch 105. The arm 108 is supported by the member 111 for rotative movement about the bearing 112. The arm 108 is provided with an insulated contact 113 adapted to engage contact 114 as the arm 108 is moved to the operated position by the spring 109 in response to the operation of the latch 105. The shaft 96 is provided with an adjustable collar 115 secured thereto as by the screw 116, the collar 115 being maintained in a predetermined angular position with respect to the shaft by reason of a flat portion 117 provided thereon. The collar 115 is provided with a flexible spring member 118 secured thereto as by the screws 119 and adapted to engage a notch 121 in the latch member 105 as the shaft 96 is extended by movement of the bellows 97 in response to the pressure of the water acting thereon. The contact 113 is normally disengaged from contact 114 by reason of the latch member 105 engaging the arm 108 in the manner illustrated on FIG. 6. When the latch member 105 is actuated by the spring member 118, the arm 108 is moved outwardly by the spring 109 thereby causing contact 113 to be brought into electrical engagement with contact 114 and thus close a starting circuit as will more clearly appear as the description proceeds.

On FIGS. 12 to 15 are shown several views of the hydrostatically operated motor control switch device employed for reversing the direction of operation of the electrical motor and propelling mechanism when the depth regulating device has moved a predetermined distance in either direction from a central position corresponding to a predetermined depth of submersion within a body of water. The device comprises, among other elements, a casing 123 secured to the casing 11 as by the bolts 27, a suitable gasket 28 being inserted between the casing 123 and the casing 11 to insure a water tight connection therebetween. The casing 123 is provided with an inwardly projecting cylindrical portion 124 having a mounting plate 125 secured thereto in any suitable manner as by threading the parts together, a gasket 126 preferably being provided for insuring a water tight connection between the plate and the casing. Threaded into the plate 125 is a cylindrical member 127 within which is slideably supported a plunger 128 secured at one end thereof as by the nut 129 and gasket 131 to an expansible bellows 132, the other end of the bellows being threaded or otherwise secured to the plate 125. A packing or gland 133 is provided between the bellows and the plate 125 to prevent the seepage of water within the bellows or within the interior contact portion of the device.

The cylindrical member 127 is provided with a shoulder or collar 134 secured thereto adapted to support one end of the spring 135 and urge the expansible bellows outwardly against the pressure of the spring 136 whereby the bellows is moved inwardly by the pressure of body of water within which the device is submerged variably in accordance with the degree of submergence thereof. The adjustable member 137 is threaded on a projecting portion 138 of the casing 123 and provided with a shoulder against which the other end of the spring 136 rests. The adjustable member 137 is provided with a plurality of indicia or scale divisions indicated generally by the numeral 139, FIG. 1, which are employed in connection with the indicating line 141 to enable the adjustable member 137 to be set at will to a position corresponding to a predetermined depth of submersion. The member 137 is also provided with a screw 142 whereby the member may be locked in any predetermined setting. The member 137 is provided preferably with an aperture 143 adapted to admit the free passage of water into contact with the outer portion of the bellows 132.

Secured to the plate 125 as by the screws 144 and screw terminals 145 is a supporting block 146 within which is secured the flexible member 147. The member 147 and supporting block are insulated from the plate 125 as by the bushings 148 which may be composed of hard rubber, Bakelite or any other material suitable for the purpose. The resilient member 147 is secured to the plunger 128 as by the nuts 149 and electrically insulated therefrom as by the bushings 151. The member 147 is provided with a pair of electrical contacts 152 adapted to engage the contacts 153 and 154 selectively in accordance with the position of the expansible bellows. The contact 153 is affixed to a stud 155 secured to the plate 125 as by the threaded screw terminal 156 and suitably insulated therefrom in the manner illustrated on the drawing. The contact 154 is affixed to an adjusting screw 157 in threaded engagement with a support 158 secured to the plate 125 as by the screws 159 and screw terminals 160 and insulated therefrom as by the bushings 161. The screw 157 is maintained in the adjusted position by the nut 162 whereby the contacts 152 are required to move through a predetermined distance to engage the contacts 153 and 154 in accordance with the vertical distance from a predetermined depth of submergence in either direction from a central or equilibrium position within which the propelling mechanism is adapted to be effective. The hydrostatic device illustrated on FIG. 13 thus comprises an arrangement in which a motor controlled circuit is adapted to be closed selectively to cause the motor to be operated either forwardly or reversely, as the case may be, in accordance with the movement of the depth regulating device to either of two positions corresponding respectively to predetermined depths of submergence of the device beneath the surface of the body of water.

The cover 163 is secured to the plate 125 as by the screws 164, suitable washers 165 being disposed between the heads of the screws and the cover and a gasket 166 being provided between the cover and the plate 125 to cause the contacts and the inner portion of the expansible bellows to be hermetically sealed whereby the effect of variations in pressure within the casing 111 from any cause such, for example, as may result from the adjustment of the bellows 57, on the adjustment of the bellows 132 is reduced to a minimum.

On FIG. 16 is shown an alternative form of the device generally similar to the device of FIGS. 1 and 2 but with the motor and propelling mechanism arranged in vertical alinement with the axis of the device whereby the device is adapted to assume a vertical position within the water. The arrangement of the parts and the method of operation is, in general, similar to the arrangement of FIGS. 1 and 2. It will be noted, however, that the lower casing 167 of the device is symmetrically arranged such that the motor and propelling mechanism are in a vertical position in substantial alinement with the axis of the device, whereas in the device of FIGS. 1 and 2 the casing 11 is rranged to support the motor and propelling mechanism t an angle with the axis of the device. As illustrated on 'IG. 17, the propelling mechanism of FIGS. 1 and 2 is dapted to be brought more nearly beneath a subfloating ody than the device of FIG. 16. As illustrated on FIGS. 6 and 18, the device of FIG. 16 is provided with a racket 168 secured thereto in any suitable manner such, or example, as by welding or brazing the parts together r as by the nuts 169 whereby the device is adapted to be onnected to a subfloating body such as the spherical nine of FIG. 18.

Referring specifically to FIG. 17 there is shown thereon spherical mine 171 of the subfloating type having a support 172 secured thereto in any suitable manner as by velding or brazing of the parts together or as by the bolts 73 illustrated, the support 172 being provided with a U olt or similar device adapted to engage a complementary ortion of the support 88 thereby to maintain the device f FIGS. 1 and 2 in locked engagement with the mine. A racket 174 is preferably provided to prevent movement etween the mine and the support 88 during the handling, ransportation and operation of the device. The bracket 174 may be secured to the mine generally in the manner f the support 172 as by the bolts 180.

The mine 171 is provided with a removable cover 175 ecured thereto in sealed relation as by the nuts 176, and f desired, a suitable gasket may be employed between the nine and the cover to prevent the leakage of water theretween. The mine is also provided with a plurality of ye bolts 190 disposed about the outer portion of the nine casing thereby to facilitate handling and transportaion of the mine.

Secured to the mine as by the brackets 177 and bolt 178 is a weight dropping mechanism comprising an inverted U-shaped frame member 179 having bent over portions 181 and 182. Secured to the portion 181 as by he nut 183 is an expansible bellows 184 adapted to actuate a pair of arms 185 pivoted at 186 against the pull of retractile spring 187. An adjusting screw 188 having a nut 189 thereon is preferably provided to control the novement of the bellows and arms 185 in accordance with he increase in pressure of the surrounding water as the device sinks within the water. The arms 185 are slotted as at 191 and 192, a bearing pin 193 connecting a notched bar 194 to the arms by reason of the slots 192 provided within the arms. The bar 194 is slideably supported within the portions 181 and 182 of the frame of the device and provided with a plurality of notched portions 195 adapted to engage the arms 196 FIG. 19, pivotally mounted preferably on a sleeve bearing 197 disposed on the rod 198, suitable hubs being provided on the various arms 196 to maintain the arms in spaced relation with respect to each other and with respect to the notched portions of the slideable bar 194.

Releasably supported by the rod 199 and sleeve 200 thereon are a plurality of weights 201, FIG. 19, having a portion 202 thereof heavier than the portion 203 whereby the weights are caused to rotate about the rod 199 by the force of gravity acting thereon as the arms 196 are successively released by the movement of the slideable bar 194. The weights 201 are provided with a shoulder or stop 204 adapted to engage the rod 205 and prevent movement of the weight in the reverse direction. The arms 196 are each provided with a curved end 206 adapted to engage a complementary recessed portion 207 of the weight 201. When the bar 194 is moved sufficiently by the hydrostat 184 a particular one of the notched portions 195 thereof is moved into alinement with the upper end of the pivoted arm 196 thereby releasing the arm for rotation about the bearing 197 and permitting the corresponding weight to rotate about the sleeve 200 and be dropped as the arm rotates clockwise into the position indicated in dashed outline on FIG. 19.

The arrangement of notches in the sliding bar 194 is such that the weights 201 are dropped in successive order in accordance with the degree of movement of the bar, and thus an arrangement is provided in which the weight of a submerged floating body is progressively decreased as the body sinks within a body of water until a sufficient reduction in the weight thereof has been effected to cause the direction of travel of the body to be reversed by reason of a positive degree of buoyancy thus acquired. By adjusting the screw 188 in a direction to increase the tension of the spring 187, a greater degree of hydrostatic pressure is required to actuate the expansible bellows 184 and thus a greater depth of submersion is required to drop the weights 201. Conversely, a decrease in the tension of the spring 187 permits the weights to be dropped successively at relatively lesser depths of submersion within the water.

On FIG. 20 is shown in diagrammatic form a submarine mine such, for example, as the mine 171 illustrated on FIG. 17 provided with the depth regulating device 10 of FIG. 1 in which the combined weight of the mine and depth regulating device is sufficient to impart a negative degree of buoyancy thereto as the mine is launched within a body of water. The mine is also provided preferably with a weight dropping mechanism of any suitable type such, for example, as the type illustrated on FIG. 17 whereby the weight of the mine is progressively decreased during the initial descent thereof within the water. The path of travel of the mine during the initial descent and the subsequent oscillations thereof are illustrated diagrammatically on FIG. 20 by the curve 208. The depth control apparatus, FIG. 13, is adjusted to cause the mine to oscillate about a central position 209 corresponding to a predetermined depth of submersion within the water, the upper and lower limits of control being indicated by the lines 211 and 212, respectively.

Let it be assumed, by way of example, that the depth control apparatus is adjusted to oscillate at a depth of 30 feet beneath the surface of the water and, furthermore, that the upper and lower depths of control 211 and 212 are at a depth of 27 and 33 feet, respectively, beneath the surface of the water. As the mine sinks for the first time, the weight dropping mechanism is caused by the increasing pressure of the water to drop the weights thereof in successive order in accordance with the depth at which the device is submerged within the water. The first weight, for example, may be dropped as the mine passes the point 213 of its travel downward, a second weight being dropped at the point 214 and a third weight being dropped at the point 215. As the weights are dropped, the negative buoyancy of the mine is progressively decreased, the mine becoming positively buoyant as the third weight is released at 215. Let it further be assumed that as the mine reaches the point 216 in its path of travel, the expansible bellows 97 is actuated sufficiently by the pressure of the surrounding water to cause the spring member 118, FIGS. 8 and 23, to engage the notch 121 of the latch 105 and thus prepare the starting switch for operation. As the point 217 of the path of travel of the mine is reached, the mine pauses momentarily in its travel downward and thereafter begins to move upward by reason of the positive buoyancy thereof. As the mine moves into the position indicated generally at 218 on the curve 208, the pressure of the water against the hydrostatic bellows 97 is reduced thereby causing the shaft 96 to be withdrawn by the spring 101 sufficiently to actuate the latch 105 and release the arm 108. As the arm 108 is moved outwardly by the spring 109 the starting switch contacts 113 and 114 are closed.

During the descent of the mine from the surface of the water to the upper control level indicated by the line 211 of FIG. 20, the contact 152 is in engagement with contact 153 of the depth control switch mechanism and as the mine passes beneath the upper control level 211, contact 152 is disengaged from contact 153. As the mine passes beneath the lower control level 212, contact 152 moves into engagement with contact 154 and remains in engagement with contact 154 until the mine has passed above the lower control level. It will be understood that the contact 152 is disengaged from contacts 153 and 154 during the passage of the mine between the control levels 211 and 212, the contact 152 being moved into engagement with contact 153 whenever the mine is above the upper control level 211 and into engagement with the contact 154 whenever the mine is below the lower control level 212.

As the mine moves above the upper control level 211, the movement of the contact 152 into engagement with contact 153 of the hydrostatically operated motor control device causes the motor M to operate the propelling mechanism in a direction to urge the mine toward the lower control level over the following circuit: Negative terminal of battery BA, conductor 219, closed contacts 114 and 113 of the starting switch mechanism, conductor 221, contacts 152 and 153 of the motor control switch, conductor 222, field winding F1 of the motor M and armature thereof, conductor 223 and thence to the positive terminal of battery BA. The motor M, it will be noted, is provided with two field windings F1 and F2 arranged to cause the motor to be operated forwardly and reversely, as the case may be, in accordance with the selective energization of the field windings F1 and F2 respectively. The operation of the motor causes the ring gear 52 to be moved by the gear train about the rotatable nut 39 until the pin 51 thereof engages the stop member 49 of the clamping ring 47. This may occur as at 224, FIG. 20, and the additional operation of the motor causes the nut 39 to be rotated by the gear 52 in a direction to force the upper portion of the expansible bellows 57 downward and thus permit additional water to flow through the apertures 72 into the casing 71 and thereby increase the specific gravity of the device.

The mine starts to descend as the point 225 of the curve 208 is reached, the descent thereof being accelerated by the operation of the propelling mechanism and the reduction in the quantity of water displaced by the device as the expansible bellows is retracted by the movement of the nut 39 about the screw 55. As the mine traverses the upper control level 211 during its downward travel, contact 152 is disengaged from contact 153 thereby interrupting the circuit to the motor and causing the motor to come to rest. The mine at this time, however, is still positively buoyant, and for this reason the downward movement of the mine is arrested at 226 and the mine again starts to move upward. As the mine passes above the upper control level 211 at 227, the contact 152 is moved by the spring 135, FIG. 13, in response to the decrease in the hydrostatic pressure against the expansible bellows 132 of the reversing switch mechanism into engagement with contact 153 thereby causing the motor to be operated by energization by the field winding F1 thereof in a direction to urge the mine downward and additionally contract the bellows 57. The mine is arrested during the upward movement above the upper control level 211 at a point 228 somewhat below the point 225 of the curve 208 by reason of the increased specific gravity of the depth control device.

As the mine passes beneath the upper control level 211 at the point 229, the motor is brought to rest. The mine continues its descent, however, until the point 231 of the curve 208 is reached, the mine starting to move upward from this point by reason of the positive buoyancy thereof. As the mine passes above the upper control level 211 at 232 the motor circuit is closed thereby additionally contracting the bellows 57 and operating the propelling mechanism in a direction to propel the mine downward. As the mine passes beneath the upper control level 211 at 233, the motor is again brought to rest, the mine continuing downward to the point 234 of the curve 208 before being arrested. Since the bellows 57 has, at this time, been operated insufficiently to cause the buoyancy of the device to be changed from a positive to a neutral or a negative value, the mine again starts to move upward.

As the mine passes above the upper control level 211 at 235 the motor is set in operation in a direction to propel the mine downward and additionally contract the bellows 57. The mines does not at this time travel as great a distance above the control level 211 as heretofore for the reason that the specific gravity thereof has been brought nearly to equality with the specific gravity of the surrounding water. The upward travel of the mine is reversed at 236, the mine passing beneath the upper control level 211 at 237 thereby causing the motor to be brought to rest. During the travel of the mine above the upper control level 211 between the points 235 and 237, the bellows 57 was continuously contracted thereby bringing the specific gravity of the mine sufficiently near to the specific gravity of the surrounding water such that the downward movement of the mine beyond the point 237 continues until the mine has passed below the lower control level 212.

As the mine reaches the lower control level at 238 the contact 152 is moved into engagement with the contact 154. The motor now operates in a direction to urge the mine upward over the following circuit: Negative terminal of battery BA, conductor 219, contacts 114 and 113 of the starting switch, conductor 221, contacts 152 and 154 of the motor control switch, conductor 239, winding of the field coil F2 and armature of the motor M, conductor 223 and thence to the positive terminal of battery BA. The operation of the motor in the reverse direction causes the mine to be urged upward by the propeller 16, and the gear 52 to be rotated in a direction to move the pin 51 away from the stop member 49 of the adjustable device 47. It will be recalled that the ring 52 is adapted to rotate about the nut 39 without causing the nut to rotate except during the time the pin 51 is engaged with either the stop member 49 or the pin 53 secured to the nut 39. During the movement of the mine below the lower control level 212 between the points 238 and 241 of the curve 208 the pin 51 moves away from the stop 49 but not sufficiently to engage the pin 53, and for this reason the nut 39 is not moved and the adjustment of the expansible bellows is unchanged at this time. As the mine rises above the lower control level 212 at the point 241, the contact 152 is moved out of engagement with contact 154 thereby interrupting the operating circuit of the motor and causing the motor to come to rest.

The mine continues to move upward until the point 242 corresponding to the upper control level 211 is reached, at which time contact 152 moves into engagement with contact 153 thereby causing the motor to be operated in a direction to urge the mine downward. When the mine reaches the point 243 on the curve 208 the motor has made the same number of revolutions since passing above the upper control level at the point 242 that it made below the lower control level since passing the point 238 and the pin 51, therefore, is brought back into engagement with the stop 49 whereby the bellows 57 is additionally contracted during the movement of the mine between the points 243 and 244 of the curve 208 at which point the mine passes below the upper control level 211 and the motor is brought to rest.

As the mine travels downward between the control levels 211 and 212 the motor remains at rest, the specific gravity of the subfloating body being just slightly less than the specific gravity of the surrounding water. The rate of oscillation of the subfloating body, it will be noted, is progressively decreased as the specific gravity of the subfloating body approaches the specific gravity of the surrounding water, the mine now moving but slightly downward past the lower control level 212. As the mine passes beneath the control level 212, contacts 152 and 154 are closed, thereby operating the motor in a direction to urge the mine upward, the motor being brought to rest at 245 as the mine rises above the lower control level.

As the mine moves above the upper control level 211 at 246 the motor is operated in a direction to urge the mine downward, and at 247 the motor has made the same number of revolutions above the upper control level that it made during the immediately preceding travel beneath the lower control level and for this reason the pin 51 again engages the stop member 49 and the expansible bellows is additionally operated by a slight amount during the relatively brief travel of the mine between the point 247 and the point 248 at which the mine passes beneath the upper control level 211. When this occurs the bellows 57 has been adjusted sufficiently to cause the specific gravity of the subfloating body to be brought to equality with the specific gravity of the surrounding water and the mine, therefore, is moved beneath the lower control level 212 as at 249 and above the upper control level as at 251 for very brief intervals of time whereby the mine is propelled intermittently by relatively short impulses from the propeller 16 in opposite directions to cause the subfloating body to move upward and downward at a slow rate of travel and the frequency of oscillation thereof to be substantially reduced. This action is maintained indefinitely without a change in the adjustment of the bellows 57 by reason of the nut and pin arrangement provided for as long a period of time as the specific gravity of the surrounding water is unchanged or the adjustments of the subfloating body are not altered, or until the source of electric power is exhausted.

As the oscillations of the subfloating body subsequent to the point 248 on the curve 208 are continued, the times during which the subfloating body passes beyond the upper and lower control levels 211 and 212 respectively during each oscillation thereof, are relatively brief and substantially of the same duration whereby the amount of power required to maintain the subfloating body in a continual state of oscillation about a predetermined depth of submersion is reduced to a minimum. Whereas on FIG. 20 the depth regulating and control mechanism is assumed to be adjusted such that the specific gravity of the subfloating body is brought into equality with the specific gravity of the surrounding water at the completion of the twelfth oscillation thereof, it will be understood that this has been done for illustrative purposes only and that the subfloating body may make a greater or lesser number of oscillations within the water before the specific gravity of the body has been adjusted to equality with the specific gravity of the surrounding water.

FIG. 21 illustrates diagrammatically the operation of the depth control device in which a weight dropping mechanism is not employed and in which the specific gravity of the device is adjusted before immersion within a body of water to a value somewhat greater than that of the water. For the purpose of illustration the depth control device 10 is shown attached to a submarine mine 171 and adapted to cause the mine to oscillate at a predetermined depth of immersion within the water. The arrangement of FIG. 23 may be employed, if desired, for controlling the device, the starting switch mechanism thereof being preferably replaced by the switch S of FIG. 27 which is moved to closed position as the mine is launched thereby closing a circuit from the battery BA by way of closed contacts 152 and 153 of the hydrostatically controlled mechanism to the motor M to energize the field winding F1 thereof and cause the motor to be operated in a direction to urge the mine downward. As the point 252 of the curve 253 is reached, the pin 51 engages the stop 49 of the adjustable member 47 thereby causing the bellows 57 to be contracted until the mine passes below the upper control level at 254 at which time the motor is brought to rest.

The mine continues to descend until the lower control level is reached at 255 at which time the motor circuit is closed in a direction to operate the motor such that the mine is urged upward by the propelling mechanism. The mine continues to descend, however, until the point 256 is reached at which point the mine starts to move upward. As the mine reaches the point 257 the motor has made sufficient revolutions to move the pin 51 from the stop member 49 into engagement with the pin 53 thereby causing the bellows 57 to be expanded and the specific gravity of the device to be reduced as the motor continues to operate. When the mine traverses the lower control level 212 at 258 the motor comes to rest by reason of the disengagement of the contact 152 from contact 153. The mine rises only as far as the point 259 of the curve 253 before starting downward by reason of the negative buoyancy thereof and as the mine traverses the lower level 212 at the point 261 the motor again starts to operate in a direction to urge the mine upward thereby additionally expanding the bellows and increasing the buoyancy of the mine.

As the mine passes above the lower control level the motor ceases to operate and the mine continues upward to the point 262 before again moving downward. The point 262, it will be noted, is somewhat higher than the point 259 by reason of the greater degree of buoyancy which has been acquired during the travel thereof beneath the lower control level 212. As the mine again crosses the lower level the motor starts into operation and reverses the direction of travel of the mine as at 263, the motor ceasing operation as the mine crosses the lower level at 264 during the upward movement thereof. The mine now rises to the point 265 before being checked by the negative buoyancy of the mine. The mine now moves downward and as it passes beneath the lower level at the point 266 the motor again starts to operate and propel the mine upward at the same time further extending the expansible bellows thereby to additionally increase the buoyancy of the mine, this action continuing until the mine passes above the lower control level at 267.

The motor now comes to rest and it may be assumed that the buoyancy thereof has been adjusted to the buoyancy of the surrounding water. The mine continues to move upward sufficiently to pass above the upper level 211 as at 268 at which point the motor operates in a direction to urge the mine downward. The mine passes below the upper level at 269, the motor having made insufficient revolutions above the upper level to cause the expansible bellows thereof to be contracted and the adjustment of the bellows and buoyancy of the mine, therefore, now remains unchanged. The mine continues to oscillate between the upper and the lower levels as at 271, 272 and 273 for as long a time as the source of power is effective to operate the motor during the passage of the mine beyond the upper and lower levels respectively.

On FIG. 22 is shown in diagrammatic form the operation of the depth control device applied to a subfloating body such, for example, as the mine 171 when the weight dropping mechanism is not employed and the initial specific gravity of the body is somewhat less than the specific gravity of the surrounding water, the mine being shown in solid outline at the time of launching and in dashed outline when the buoyancy thereof has been reduced sufficiently to cause the mine to sink within the water. It will, of course, be understood that the mine is provided with a suitable switch for connecting the motor to the source of power when the mine is launched whereby, after the motor has made a sufficient number of revolutions in a direction to urge the mine downward, the expansible bellows 57 is caused to operate as at 274 and be contracted until the specific gravity of the mine has been increased sufficiently to cause the mine to sink beneath the surface of the water. The mine now begins to descend at a somewhat increasing rate of travel by reason of the decrease in the buoyancy thereof as the motor continues to operate the bellows until the mine passes beneath the upper level 211 at 275, at which time the motor is brought to rest by the contact 152 moving away from contact 153, the mine continuing to descend until the lower control level is traversed at 275' at which time contact 152 is moved into engagement with contact 154 thereby causing the motor to operate in the reverse direction and urge the mine upward.

The mine is arrested at 276 and moves upward, traversing the lower control level 212 at 277, thereby causing contact 152 to be disengaged from contact 154 and the motor to be brought to rest. During the travel of the mine beneath the lower control level 212, the motor made an insufficient number of revolutions to cause the pin 51 on the gear 52 to be moved into engagement with the pin 53 and the expansible bellows, therefore, is not adjusted during the travel of the mine below the control level 212 intermediate the points 275' and 277 of the curve 278.

The mine continues to move upward within the water by reason of the positive buoyancy thereof until the point 279 of the curve 278 is reached at which time the direction of movement of the mine is reversed and the mine starts to move downward. As the mine passes above the upper control level 211 at 281, contact 152 is moved into engagement with contact 153 thereby operating the motor in a direction to urge the mine downward. When the motor has made the same number of revolutions above the upper control level 211 that it made below the lower control level 212, the gear 52 is rotated sufficiently to cause the pin 51 thereof to be brought into engagement with the stop member 49 as at 282 whereby the bellows is additionally adjusted in a direction to increase the specific gravity of the subfloating mine as the motor continues to operate while the mine is above the upper control level 211. As the mine traverses the upper control level at 283 during the downward travel thereof the motor is brought to rest, and the mine continues to move downward by reason of the momentum imparted thereto by the propelling mechanism since the mine passed the point 279 of the curve 278. The lower control level 212 is traversed by the mine during the downward movement thereof at 284, the mine coming to rest at 285 and starting to move upward in response to the operation of the propelling mechanism which was set in operation as the mine crossed the lower control level at 284. As the mine again crosses the lower control level as at 286 during the upward movement of the mine, the motor is brought to rest, insufficient revolutions of the motor having been made beneath the lower control level at this time to change the adjustment of the expansible bellows.

As the mine crosses the upper control level 211 at 287 the motor is set in operation in a direction to urge the mine downward and when the motor has made the same number of revolutions above the upper control level at 288 that it made below the lower control level intermediate the points 284 and 286 of the curve 278, the bellows is additionally contracted thereby further reducing the buoyancy of the mine until the point 289 of the upper control level is reached thereby bringing the motor to rest at 289. As the mine passes below the lower control level at 291 the motor is reversed thereby causing the mine to be arrested at 292 and propelled upward. As the mine passes the lower control level at 293 the motor is brought to rest, insufficient revolutions of the motor having been made beneath the lower control level to change the adjustment of the bellows. As the mine passes above the upper control level at 294 the motor is reversed thereby arresting the mine at 295 and causing the mine to be propelled downward. As point 296 of the curve 278 is reached the expansible bellows is additionally adjusted in a direction to increase the specific gravity of the mine, this adjustment of the bellows continuing until the mine passes beneath the upper control level at 297 thereby stopping the motor.

The expansible bellows, it will be noted, has been successively adjusted by progresively decreasing amounts during the travel of the mine above the upper control level whereby the specific gravity of the mine has been brought to equality with that of the surrounding water.

The mine continues to oscillate about a central control position or position of equilibrium 209, passing beyond the upper and lower control limits as at 298, 299 and 301 without additionally adjusting the specific gravity of the mine except as may be required to maintain the specific gravity thereof in matched relation with the specific gravity of the surrounding water.

Whereas as in FIG. 22 the mine is shown as making six oscillations before the specific gravity thereof is brought to equality with the specific gravity of the surrounding water, it will be understood that this has been done for the purpose of illustration only and that the mine may make a greater or lesser number of oscillations during which the specific gravity thereof is adjusted at intervals of progressively decreasing steps until the specific gravity of the mine has been brought into equality with the specific gravity of the water.

On FIG. 24 is shown an alternative form of depth regulating and controlling mechanism adapted to operate generally in the manner and for the purpose of the device of FIGS. 1 and 2 in which the expansible bellows and screw arrangement for varying the displacement of a body within a body of water has been replaced by a flexible diaphragm in communication at one side thereof with the surrounding water and adapted to be expanded or contracted, as the case may be, in accordance with the quantity of fluid enclosed within a chamber having a flexible diaphragm sealed at the outer edge thereof. The device comprises a casing 302 having a bracket 303 secured thereto in any suitable manner as by welding or brazing the parts together or as by the bolts 304. The casing 302 is provided with a flanged portion 305 at the upper end thereof to which is secured a chamber 306 having a flexible diaphragm 307 sealed thereto and a cover 308 clamped thereto as by the bolts 309 and nuts 311, suitable washers being provided preferably beneath the heads of the bolts and nuts in the manner illustrated. The chamber 306 is hermetically sealed to the casing 302 as by the gasket 312 inserted therebetween and the flexible diaphragm 307 is maintained in sealed relation to the chamber 306 as by a clamping ring 313, thereby to prevent the leakage or seepage of water within the chamber and the escape of fluid therefrom except through the tubular member 314 connected thereto, FIG. 27. The cover 308 is provided with a plurality of apertures 315 adapted to allow the water within which the device is submerged to flow freely into the cover 308 or be expelled therefrom, as the case may be, in accordance with the adjustment of the flexible diaphragm 307 as the device is brought to and maintained in equality with the specific gravity of the surrounding water.

The casing 302 is also provided with means such as the lugs 316 adapted to receive the bolts 317 and maintain a housing 318 securely clamped to the lower end of the casing, a platform or partition 319 being assembled between the casing 302 and housing 318 and provided with a gasket 321 intermediate the platform and the casing 302 to exclude the water therefrom. There is secured to the lower portion of the housing 318 an annular member 322 as by a plurality of posts 323 whereby the annular member or guard 322 is disposed a distance from the housing 318 sufficient to enclose and protect a propeller 324 fastened to a shaft 325 passing through a bearing 326 secured to the housing 318, the other end of the shaft passing through a suitable gland or packing secured to the platform 319 and being operatively connected to a reversible motor MO, whereby the propeller is caused to urge the device upward or downward, as the case may be, in accordance with the direction of operation of the motor. Secured to the shaft 325 is a pulley 327, FIG. 27, connected as by the belt 328 to the pulley 329 supported by the shaft 331. Secured preferably to the platform 319 in any suitable manner is the gear box 332 having a plurality of gears and shafts therein operatively connected together in such a manner that the shaft 333 is adapted to make a fractional part of a revolution when the shaft 331 and pulley 329 have made a predetermined number of revolutions. Rotatively mounted on the shaft 333 and yieldably connected thereto as by the spring 334, the washer 335 and nut 336, is a rotatable disk or pulley 337 having a pair of arms 338 and 339 pivotally connected thereto as at 341 and 342 respectively.

The shaft 333 is provided preferably with a shoulder against which the disk member 337 is urged by the spring 334 thereby providing an arrangement in which the member 337 is frictionally operated by the shaft 333 in either direction in accordance with the direction of movement of the motor MO. The opposite end of the arms 338 and 339 pass through suitable apertures within the supporting member 343 pivotally mounted as at 344 and urged against a back-stop 345 by a retractile spring 346 secured thereto and to the pin 347 supported by the base 319. A pair of nuts 348 and 349 are threaded on the ends of the arms 338 and 339 respectively whereby the supporting member 343 is caused to move about the pivot or shaft 344 away from the stop pin 345 as the disk member 337 is rotated away from the position shown on FIG. 27 regardless of the direction of rotation of the disk member.

Secured to the pivoted support 343 in any suitable manner as by the screws 351 is a pump 352 having a shaft 353 to which is secured a friction pulley 354 adapted to engage a driving wheel 355 secured to the shaft 325 and adapted to set the pump in operation in response to movement of the disk member 337 and the arms 338 or 339, as the case may be.

There is also secured to the inside portion of the casing 302 in any suitable manner a fluid container 356 having a quantity of liquid therein such as castor oil or the like and provided with a nipple 357 at the bottom side thereof to which is secured a pipe or length of tubing 358 having the other end thereof connected to a T fitting 359 from whence the connection is continued by way of the tube 361 to the pump 352. There is also provided a control valve indicated generally by the numeral 362 having three outlets thereon, one of the outlets being connected by way of the tube 363 to the T connection 359, another of the outlets being connected by the tube 364 to the opposite side of the pump 352, and the third outlet being in connection with the container or chamber 306 as by the tube 314.

The control valve will be best understood by consideration of FIG. 26 on which is shown a considerably enlarged sectional view of the valve corresponding generally to the view of the valve shown on FIG. 27. The valve comprises a casing 365 having a pair of nipples 366 and 367 secured thereto to which are connected the tubes 363 and 364 respectively. The casing 365 is also provided with a partition or baffle member 368 in registered engagement with a shoulder 369 within the casing 365 and hermetically sealed to the casing as by brazing or soldering the parts together. An expansible bellows 369 is secured to the partition or baffle 368 as at 371 thereby providing an arrangement in which a chamber 372 is formed between the bellows and the casing 365 whereby the lower end 373 of the bellows is caused to move upward or downward in accordance with variations in the pressure of the liquid within the chamber 372 and the differential pressure between the inside and outside of the bellows.

The casing 365 is provided with a cap or plate 374 secured thereto in any suitable manner as by threading the parts together, a suitable gasket 375 being provided therebetween to seal the joint and prevent the leakage of fluid from within the valve. The plate 374 is provided with a tapped hole within which is threaded the member 376, a gasket 377 being provided therebetween to prevent the leakage or seepage of oil from the control valve member. The member 376 is provided with a valve seat 378 adapted to receive the valve 379 of any suitable shape such as the ball valve illustrated and having a rod or plunger 381 secured thereto and slidably disposed within the cylindrical portion 382 of the member 376. A stop device such as the pin 383 passing through the stem 381 is provided to prevent excessive movement of the valve from the seat thereof in response to contraction of the expansible bellows 369 or the pressure of the liquid on the under side of the valve, as the case may be. The member 376 is provided with a plurality of ducts 384 whereby the passage of oil through the valve is facilitated. The baffle 368, it will be noted, is provided with an aperture 385 whereby the interior of the bellows 369 is in communication with the nipple 367 having the tube 364 thereon extending to the pump 352. The member 376 is also provided with a threaded portion 386 adapted to receive a packing nut 387, FIG. 27, whereby the tube 314 is connected to the control valve as by the nipple 388 disposed within the packing nut and sealed thereby to the plate 374 of the control valve.

The depth control and regulating mechanism also comprises a hydrostatically controlled reversing switch such as the switch device of FIG. 13 secured to platform 319 in sealed relation thereto and having the aperture 143 thereof in communication with the water within which the device is submerged as by the aperture 389 within the housing 318, FIG. 24, the switch control mechanism comprising an expansible bellows 132, FIG. 27 adapted to move the contact element 152 thereof into engagement with the contacts 153 and 154 selectively in accordance with the degree of pressure of the surrounding water. There is also provided a switch S adapted to be moved to closed position by the hydrostatic pressure of the water as by a suitable bellows arrangement or flexible diaphragm secured to the platform 319 or, if desired, the switch may be of the type adapted to be moved to closed position manually prior to the launching of the device within the body of water, it being, of course, understood that when the manual type of switch is employed the control therefor includes a movable member sealed as by a gland to the platform 319 whereby the entrance of the water within the casing 302 is prevented. Also the arrangement of the manual switch upon the platform 319 is such that access thereto for the purpose of operating the switch may be obtained preferably through the aperture 389 within the casing 318 or, if desired, an additional aperture may be provided, or the switch control member therefor may extend through the housing 318.

There is also provided within the casing 302 a battery BA of any suitable type such, for example, as the type illustrated on FIGS. 24 and 27 supported preferably by a platform or shelf 391 secured to the platform 319 as by the posts 392 and having preferably a plurality of additional posts 393 extending upward therefrom adapted to support a platform 394 upon which the container 356 rests. The container is securely maintained in position with respect to the platform 394 as by the retaining ring 395 secured in any suitable manner to the inner portion of the casing 302. Whereas on FIGS. 24 and 27 the battery BA is shown as a plurality of dry cells, it will be understood that, if desired, other forms and types of batteries may be employed and, furthermore, that suitable resilient padding may be included in the structure to prevent injury or damage to the battery and to other parts of the control mechanism as the result of the shocks received during the handling, transportation or launching of the device.

The operation of the device of FIG. 24 will best be understood by consideration of FIG. 27 on which the entire system is shown in diagrammatic form. Let it be assumed, by way of example, that the container 356 has been supplied with a copious quantity of liquid such, for example, as castor oil or the like sufficient to distend the flexible diaphragm 307 by the amount required to impart a positive degree of buoyancy to the device when immersed within a body of water and, let it also be assumed that the nuts 348 and 349 have been adjusted on the members 338 and 339 respectively in accordance with the difference in the extent of operation of the motor beyond the upper and lower control levels respectively required to produce a change in the adjustment of the specific gravity of the device. Furthermore, let it be assumed that the expansible bellows 132 controlling the reversing switch has been adjusted by the settable member 137 thereof to the predetermined depth about which the device is adapted to oscillate and that the contacts 153 and 154 of the reversing switch mechanism have been set to control the amplitude of oscillation of the device about the predetermined control level within the water. The switch S is closed either manually or by the pressure of the water, as the case may be, thereby completing a circuit from the positive terminal of battery BA by way of conductor 396, contacts of switch S, conductor 397, contacts 152 and 153 of the reversing switch mechanism, conductor 398, motor MO, conductor 399 and thence to the negative terminal of battery BA thereby causing the motor to operate in a direction to propel the mine downward.

If it be assumed that the mine at this time is negatively buoyant and not provided with a weight dropping mechanism, the mine continues to descend until the upper control level is traversed thereby disengaging contact 152 from contact 153 of the reversing switch and bringing the motor to rest. It may be assumed, for the purpose of description, that during the passage of the mine from the surface of the water to the upper control level, the motor made an insufficient number of revolutions to rotate the shaft 333 and disk member 337 frictionally mounted thereon through a sufficient angular distance to cause the pump to be actuated by the driving wheel 355 secured to the propeller shaft 325.

As the device passes beneath the lower control level contact 152 of the switch reversing mechanism is moved into engagement with contact 154 thereof thereby establishing a circuit from positive terminal of battery BA, conductor 396, contacts of switch S, conductor 397, contacts 152 and 154, conductor 401, motor MO, conductor 399 and thence to the negative terminal of battery BA thereby causing the motor to operate in a reverse direction and urge the mine upward. The motor, it will be noted, is of the reversible type preferably having two field windings respectively connected to the conductors 398 and 401 whereby the motor may be operated in either direction in accordance with the selective connection of the conductors 398 or 401 to a source of power.

When the motor has made a sufficient number of revolutions beneath the lower control level the shaft 333 and disk member 337 thereon is rotated from the position shown in the drawings thereby withdrawing the arm 338 and nut 348 sufficiently to actuate the supporting member 343 about the pivot support 344 and cause the friction pulley 354 to be engaged by the driving wheel 355 and set the pump in operation in a direction to force oil from the container 356 into the casing 306 and thereby expand the flexible diaphragm 307. When this occurs a portion of the water within the housing 308 is expelled through the apertures 315 therein and the quantity of water displaced by the device is increased thereby increasing the buoyancy of the device. The motor continues to operate until the buoyancy has been increased sufficiently to cause the mine to rise above the lower control level thereby disengaging contact 152 from contact 154 and bringing the motor to rest. During the operation of the pump beneath the lower control level the pressure of the oil beneath the valve 379 caused the valve to be raised from the valve seat thereby to admit the passage of oil into the chamber 306. As the flow of oil into the chamber 306 ceases when the pump stops, the valve 379 moves into engagement with the valve seat thereby preventing the return flow of oil from the chamber 306 during the time that the pump is unoperated.

The mine is arrested by reason of the negative buoyancy thereof before passing above the upper control level and as the mine again passes below the lower control level during the downward travel thereof, contact 152 is moved into engagement with contact 154 thereby operating the motor in a direction to propel the mine upward and forcing additional oil within the chamber 306 thereby decreasing the specific gravity of the device. As the mine passes above the lower control level the motor thereof is brought to rest and the valve 379 is closed. This cycle of operations is repeated until the buoyancy of the mine has been increased sufficiently to cause the mine to pass above the upper control level during the upward movement thereof thereby causing contact 152 to be moved into engagement with contact 153 and reverse the direction of operation of the motor such that the mine is urged downward by the propeller 324. The rotatable disk 337 is, of course, moved in the reverse direction by the reversal of the motor thereby causing the pump to be moved away from the driving wheel 355 by the retractile spring 346. Substantial movement of the pump above the upper control level during this time is thus prevented.

As the mine crosses the upper control level during the downward movement thereof, contact 152 is disengaged from contact 153 thereby stopping the motor and as the mine again traverses the lower control level the motor is again operated to urge the mine upward. When the motor has made a number of revolutions below the lower control level corresponding to the number of revolutions of the motor above the upper control level, the pulley 354 is brought into engagement with the driving wheel 355 thereby operating the pump and forcing additional fluid from the container 356 into the chamber 306 and causing the flexible diaphragm 307 to be additionally expanded until the mine passes above the lower control level at which time the motor and pump are brought to rest and the valve 379 is permitted to close.

Let it be assumed, by way of illustration, that the diaphragm 307 has been expanded sufficiently at this time to impart a positive buoyancy to the mine whereby the excursions of the mine above the upper control level are of greater duration than the travel of the mine below the lower control level. As heretofore stated, the motor is caused by the hydrostatically controlled switch to be operated only during the time that the mine has passed beyond the upper and lower control levels respectively and, when the mine is positively buoyant, the time of travel of the mine above the upper control level is of greater duration than the time of travel of the mine below the lower control level and, for this reason, the rotatable disk 337 will be progressively rotated in one direction by a greater amount of movement than in the opposite direction in accordance with the difference in the extent of operation of the motor in each of the two directions. The disk 337 is therefore moved angularly in opposite directions until a sufficient angular movement thereof from the initial position of operation of the pump has been accomplished, sufficient to bring the friction pulley 354 of the pump into engagement with the driving wheel 355 during the time of travel of the mine above the upper control level when the motor is, of course, operating in a direction to urge the mine downward. The pump is thus caused to operate in a direction to force oil from the chamber 306 into the container 356 and thus contract the flexible diaphragm.

The operation of the pump to contract the diaphragm causes the pressure on the tube 364 to be decreased and the pressure on the tubes 361 and 363 to be increased thereby forcing the expansible bellows 369, FIG. 26, upward by reason of the pressure differential on the bellows. As the bellows moves upward the lower end 373 thereof engages the plunger 381 causing the plunger to move upward and disengage the valve 379 from the valve seat 378 thereby permitting the flow of oil from the chamber 306 to the container 356 as the pump continues to operate. As the mine passes below the upper control level, the pump is brought to rest and the pressure differential against the inside and outside of the bellows 369 is reduced sufficiently to permit the valve 379 to close and prevent the escape of liquid from the chamber 306 during the time that the pump is at rest. The flow of liquid between the container 356 and the chamber 306 is thus controlled automatically in accordance with the difference in the extent of operation of the motor beyond the upper and lower control levels whereby the specific gravity of the device is brought into equality with the specific gravity of the surrounding water and maintained in equality with the water until the battery is exhausted or the mine is exploded, as the case may be.

Briefly stated in summary, the present invention provides a depth regulating and controlling device of the type adapted to be attached to or incorporated within a subfloating body in which the specific gravity thereof is brought automatically into equality with the specific gravity of the surrounding water and in which the subfloating body is caused to oscillate about a control level corresponding to a predetermined depth of submersion within the water, and in which the amplitude of such oscillatory movement is controlled in accordance with a predetermined setting of the device and a minimum of energy is required to maintain the device in oscillation about the control level. Furthermore, new and improved means have been provided for preventing additional adjustment of the water displacing mechanism during the oscillatory movement of the device when the specific gravity thereof is the same as the specific gravity of the surrounding water.

While the invention has been described in detail with respect to several preferred examples thereof which give satisfactory results, it will be understood by those skilled in the art to which the invention pertains, after understanding the invention, that various changes, modifications and instrumentalities may be employed without departing from the spirit and scope of the invention and it is our intention, therefore, in the appended claims to cover all such changes, modifications and instrumentalities.

The invention herein described and claimed may be manufactured and used by or for the Government of the United States of America for governmental purposes without the payment of any royalities thereon or therefor.

What is claimed as new and desired to be secured by Letters Patent of the United States is:

1. In a subfloating body adapted to perform an oscillating movement about a position of equilibrium below the surface of the water, means for varying the displacement of the body, a source of power for effecting the variations of displacement, means including a motor for propelling the body alternately in opposite directions about said position of equilibrium, a hydrostatic device having means for operatively connecting the propelling means to said source of power selectively thereby to cause the body to oscillate about said position of equilibrium, and means controlled by said propelling means for causing the displacement of the body to be varied only when said motor has made a predetermined number of revolutions in either direction without rotative movement meanwhile in the reverse direction.

2. In a subfloating body adapted to perform an oscillating movement about a position of equilibrium below the surface of the water, means for propelling the body alternately in opposite directions, a source of power, a hydrostat device having means adapted to connect said propelling means to the source of power selectively in accordance with the depth of submersion of the device thereby to cause the body to oscillate about said position of equilibrium, and volume changing means controlled by said propelling means for causing the specific density of the body to be adjusted to continuous equality with the specific density of the surrounding water.

3. In a subfloating body adapted to perform an oscillatory movement about a position corresponding to a predetermined depth of submersion within a body of water, a source of power, means including a motor for propelling the body alternately in opposite directions, an automatic hydrostat device having means for causing the propelling means to be operated in one direction by said source of power when the body is above an upper depth and for causing the propelling means to be operated in the opposite direction by said source of power when the body is below a lower depth, said hydrostat device being arranged to disconnect the propelling means from the source of power at the time the body is intermediate said upper and lower depths, and means including a volume changing device adapted to be operated by said motor for continuously maintaining the specific density of the subfloating body the same as the specific density of the surrounding water.

4. In a subfloating body adapted to perform an oscillating movement about a position corresponding to a predetermined depth of submersion within a body of water, a source of power, rotatable means including a motor for propelling the body alternately in opposite directions, a hydrostat device having means for causing the rotatable propelling means to be operated selectively in either of said directions by said source of power when the body has moved beyond a predetermined vertical distance from said position and for preventing the operation of the propelling means when the body has moved within said predetermined distance, and means operated by said motor selectively in accordance with the extent of rotation of said propelling means in either of said directions without rotative movement meanwhile in the reverse direction for adjusting the specific density of the body to the specific density of the surrounding water.

5. In a subfloating body adapted to perform an oscillating movement about a position corresponding to a predetermined depth of submergence within a body of water, means including a releasably supported mass for imparting a negative degree of buoyancy to the body to cause the body to sink within the water, means controlled by the pressure of the water for releasing said mass when the body has descended to a predetermined depth of submergence within the water thereby to import a positive degree of buoyancy to the body sufficient to cause the body to rise within the water, propelling means including an electric motor adapted to operate alternately in opposite directions thereby to cause the body to perform said oscillating movement, a source of electrical power, a hydrostat device having means for controlling the operation of said propelling means selectively in each of said opposite directions in accordance with the depth of submersion of the body, means including a switch device effective when the body has risen for the first time to a predetermined depth for operatively connecting said propelling means to said source of power selectively under control of said hydrostat device, and means controlled by said electric motor for causing the specific density of the body to be adjusted to equality with the specific density of the surrounding water during said oscillating movement of the body.

6. In a submersible body adapted to perform an oscillating movement about a position of equilibrium below the surface of a body of water, a source of power, means including a prime mover for propelling the body in opposite directions about said position of equilibrium, a hydrostatic device for causing the propelling means to be operatively connected to said source of power thereby to urge the body in either direction toward said position of equilibrium during the time the body has passed beyond certain predetermined limits of control depth and to disconnect the propelling means from the source of power when the body has moved within said predetermined limits of control depth, and volume changing means actuated selectively by said prime mover during the time the body has passed beyond said predetermined limits of control depth for bringing the specific density of the body into continuous equality with the specific density of the surrounding water.

7. In a device for controlling the position of a submersible body in a body of water, the combination of means for causing the body to sink to a predetermined depth within the water and thereafter to rise, pressure responsive mechanism including electrical contacts adapted to be closed when the body has risen to an intermediate level within the water, a source of electrical energy, propelling mechanism including a revolvable member, a second hydrostat having means controlled by the electrical contacts of said pressure responsive mechanism for closing a circuit from the source of power to the propelling device as the body passes above an upper control level, means effective only when said member has made a predetermined net number of revolutions in a direction to urge the body downward for reducing the buoyancy of the body, and means controlled by said second hydrostat for reversing the direction of rotation of said propelling device and revolvable member when the buoyancy of the body has been reduced sufficiently to cause the body to pass beneath the lower control level.

8. In a device for controlling the position of a submersible body in a body of water, the combination of means for causing the body to sink to a predetermined depth within the water and thereafter to rise, pressure responsive mechanism including electrical contacts adapted to be closed when the body has risen to an intermediate level within the water, a source of electrical energy, propelling mechanism including a revolvable member, a second hydrostat having means controlled by the electrical contacts of said pressure responsive mechanism for closing a circuit from the source of power to the propelling device as the body passes above an upper control level thereby to actuate the propelling device in a direction to cause the body to descend beneath the upper control level, movable means effective only when said member has made a predetermined net number of revolutions in a direction to urge the body downward for reducing the buoyancy of the body, and means for preventing additional movement of said buoyancy reducing means when the number of revolutions of the revolvable member during each passage of the body above the upper control level is the same as the number of revolutions during each passage of the body below the lower control level.

9. A submarine floating body adapted to oscillate about a position of equilibrium at a certain depth of submersion, comprising calibrating means for changing the specific gravity of said body, propelling mechanism for urging the body in either of two opposite directions, a source of electrical energy, a hydrostatic device, electro-responsive means controlled by said hydrostatic device for actuating said propelling mechanism selectively in each of said two opposite directions as the body passes beyond certain control limits of submersion, and means for causing said calibrating means to effect repeated changes in the specific gravity of the body in time delayed relation with respect to the actuation of said propelling mechanism until the specific gravity of the body has been brought to continuous equality with the specific gravity of the surrounding water.

10. In a device for causing a submersible body to oscillate about a central position corresponding to a predetermined depth of submersion, the combination of reversible means for propelling the body alternately in opposite directions, a source of power, a hydrostatic device having means for causing the propelling means to be operated selectively by said source of power when the device has moved a predetermined distance in either direction from said central position, a casing having a plurality of apertures therein through which water is adapted to flow, a volume changing device settable to different settings and adapted to vary the volume of water within said casing, means including a screw member controlled by said propelling means for changing the setting of the volume changing device in accordance with the extent of operation of the propelling means in each of said directions, and means for preventing a change in the setting of said volume changing device during subsequent oscillations of said body when the volume of water within the casing has been adjusted to an amount sufficient to cause the specific gravity of the submersible body to be brought to equality with the specific gravity of the surrounding water.

11. In a device for causing a submersible body to oscillate about a central position corresponding to a predetermined depth of submersion, the combination of reversible means for propelling the body in opposite directions, a source of power, a hydrostatic device having means for causing the propelling means to be operated selectively by said source of power when the device has moved a predetermined distance in either direction from said central position, a vessel, a flexible diaphragm secured to the periphery of said vessel in communication with the water for varying the water displaced by the body, a container having a copious supply of liquid therein, means controlled by the propelling means in accordance with the extent of movement of the body in each of said opposite directions for causing said liquid to flow in either direction between the container and the vessel during the movement of the body beyond said predetermined distance when the specific gravity of the submersible body differs from the specific gravity of the surrounding water, and means for preventing the additional flow of liquid between the container and the vessel when the specific gravity of the body is the same as the specific gravity of the surrounding water.

12. In a subfloating body adapted to perform an oscillatory movement about a position corresponding to a predetermined depth of submersion within a body of water, a source of power, means including a motor for propelling the body alternately in opposite directions, a hydrostatic device having means for causing the propelling means to be operated selectively in opposite directions by said source of power when the device has moved a predetermined distance in either direction from said position, a container having a copious supply of liquid therein, a vessel having a pressure responsive element in communication with the water adapted to vary the specific gravity of the body in accordance with the quantity of liquid stored within the vessel, a pipe line having a normally closed valve therein interconnecting said container and chamber, means controlled by the extent of operation of said motor in each of said directions for applying pressure selectively in either direction to the liquid within said pipe line, and means for causing said valve to open and permit the flow of the liquid between the container and the vessel regardless of the direction of the pressure applied to the liquid by said pressure applying means.

13. In a subfloating body adapted to perform an oscillatory movement about a position corresponding to a predetermined depth of submersion within a body of water, a source of power, means for propelling the body alternately in opposite directions, a hydrostatic device having means for causing the propelling means to be operated selectively in opposite directions by said source of power when the device has moved a predetermined distance in either direction from said position, a container having a copious supply of liquid therein, a vessel having a pressure responsive element in communication with the water adapted to vary the specific gravity of the body in accordance with the quantity of liquid stored within the chamber, a pipe line interconnecting said container and vessel having a normally closed valve therein adapted to prevent the escape of liquid from the vessel when the valve is unoperated, a reversible pump member intermediate said conainer and valve adapted to force the liquid through said ipe line in either direction in accordance with the direction of movement of the pump member, means controlled y said propelling means for operating said pump member electively in accordance with the extent of operation of aid propelling means in each of said opposite directions, a ranch connection intermediate the container and the ump, and pressure responsive means operatively connected to said branch connection for causing the valve to pen when the pump member is operated in a direction to ransfer liquid from said vessel to the container.

14. In a subfloating body adapted to perform an oscillating movement about a position corresponding to a predetermined depth of submersion within a body of water, a ource of power, means including a motor for propelling he body alternately in opposite directions, a hydrostatic levice having means for causing the propelling means to e operated selectively in opposite directions by said ource of power when the device has moved a predetermined distance in either direction from said position, a container having a copious supply of liquid therein, a essel having a pressure responsive element in communication with the water adapted to vary the specific gravity of the body in accordance with the quantity of liquid tored within the vessel, a pipe line interconnecting said container and vessel having a normally closed valve therein adapted to prevent the escape of liquid from the vessel when the valve is unoperated, a reversible pump member ntermediate said container and valve adapted to force iquid through said pipe line in either direction accordance with the direction of movement of the pump member, a branch connection intermediate the container and the pump member, pressure responsive means operatively connected to said branch connection for causing the valve to open when the pump member is operated in a direction to ransfer liquid from the vessel to the container, and means controlled by said propelling means and settable at will for causing said pump member to be operated selectively n accordance with a predetermined difference in the operation of said propelling means in each of said opposite directions.

15. In a device for causing a submersible body to oscillate about a central position corresponding to a predetermined depth of submersion within a body of water, electro-responsive means for propelling the submersible body alternately in opposite directions, means controlled by said propelling means for bringing the specific gravity of the submersible body into equality with the specific gravity of the surrounding water, a source of power, a hydrostatically controlled reversing switch adapted to connect the electro-responsive means to said source of power selectively in accordance with a predetermined vertical degree of travel of the submersible body in either direction from said central position, a starting switch adapted to render said reversing switch effective, and means controlled by the depth of submergence of the body within the water for actuating said starting switch to the closed position thereof in response to a predetermined decrease in the pressure of the surrounding water.

16. In a device for causing a submersible body to oscillate about a central position corresponding to a predetermined depth of submersion within a body of water, means including a reversible motor adapted to propel the body alternately in opposite directions, means controlled by the motor for causing the specific gravity of the body to be continuously maintained at equality with the specific gravity of the surrounding water, a source of power, a hydrostatic device having circuit closing means for causing the propelling means to be operated selectively by said source of power when the device has moved a predetermined vertical distance in either direction from said central position and to be disconnected therefrom when the device has moved less than said predetermined distance from said central position, and means on said hydrostat device and settable at will to different settings corresponding respectively to different ranges of vertical movement of the body from said central position.

17. In a device for causing a submersible body to oscillate about a central position corresponding to a predetermined depth of submersion within a body of water, a source of power, means including an electric motor for propelling the submersible body alternately in opposite directions, a speed reduction device operatively connected to said motor, an adjustable bellows having one side thereof in contact with the water and adapted to vary the specific gravity of the body in accordance with the adjustment of the bellows, a screw member secured to said bellows, a reversible nut in threaded engagement with said screw member, means for supporting said nut for rotation about an axis, a stop member on said nut, a threaded portion on said nut having a gear rotatably mounted thereon in continuous engagement with said speed reduction device, a pin on said gear adapted to engage said stop member and rotate the nut when the gear is rotated a sufficient distance in one direction, means settable at will for causing the nut to be rotated in the reverse direction by the gear when the gear has been moved a predetermined angular distance from said stop member, a hydrostatic device adapted to be operated when the device has moved a predetermined vertical distance in either direction from said central position, and a reversing switch controlled by said hydrostatic device for causing the motor and gear to be operated selectively in opposite directions in accordance with the extent of movement of the device beyond said vertical distance from said central position.

18. A submarine floating body adapted to oscillate about a position of equilibrium at a certain depth of submersion, comprising calibrating means for changing the specific gravity of said body, propelling mechanism for urging the body in either of two opposite directions, a source of electrical energy, a hydrostatic device, electro-responsive means controlled by said hydrostatic device for actuating said propelling mechanism selectively in each of said two opposite directions as the body passes beyond certain control limits of submersion, means including a rotatable member for causing said calibrating means to effect changes in the specific gravity of the body in time delayed relation with respect to the actuation of said propelling mechanism, and means on said calibrating means and settable at will to a setting corresponding to a predetermined extent of actuation of the propelling mechanism before a change in the specific gravity of the body is effected, said last named means being arranged on said calibrating means and controlled by said rotatable member.

19. Apparatus for controlling the depth of submersion of a subfloating body and comprising a casing, a housing in end engagement with an end of said casing and secured in fluid-tight relationship thereto, transverse partition means mounted within said housing in fluid-tight relation therewith and to thereby divide the housing into a battery chamber in one end portion of the housing and a buoyancy chamber in the other end portion of the housing, a battery disposed within said battery chamber, an expansible bellows mounted within said buoyancy chamber and having the base thereof transversely secured to the other end of the housing in fluid-tight relationship therewith to thereby effectively seal the buoyancy chamber at each end thereof, a plate closing the top of said expansible bellows, said buoyancy chamber having a plurality of apertures in the wall thereof whereby the exterior portion of the bellows is in communication with the water surrounding the apparatus, a delay drive mechanism mounted within the bellows and drivingly connected thereto for selectively causing expansion and contraction thereof, reversible propelling means mounted partially within and partially without said casing and drivingly connected to said drive mechanism, circuit means connecting said battery to said propelling means, and adjustable hydrostatic reversible switch means in series circuit with said battery and said propelling means whereby the propelling means is operated selectively in accordance with the depth of submersion of the apparatus and the bellows is operated only after the propelling means has operated for a predetermined time interval.

20. Apparatus for controlling the depth of submersion of a subfloating body and comprising a housing having a plurality of apertures in the wall thereof, a casing secured in end-to-end and fluid-tight relationship with said housing, a reversible motor mounted within said casing, propelling means for causing motion of said body upwardly or downwardly selectively in accordance with the depth of submersion thereof and connected in driven relationship with said motor, expansible means mounted within the housing and having the exterior portion thereof in fluid communication with the exterior of the body by way of said apertures, a delay drive mechanism operatively connected to the motor and said expansible means for causing the expansible means to be actuated to thereby adjust the specific density of the body to be continuous equality with the specific density of the surrounding water after the motor has operated for a predetermined number of revolutions.

21. A device for causing a subfloating body to oscillate within predetermined limits about a predetermined depth of submersion in a body of water and comprising a reversible prime mover, a source of power operatively connected to said prime mover, means for reversing the direction of operation of the prime mover, a delay drive mechanism and propelling means respectively connected in driven relationship with the prime mover, apertured wall portions and partition means defining a buoyancy chamber, expansible means mounted within the buoyancy chamber and operatively connected to said delay drive mechanism for causing the specific density of the body to be varied after the prime mover and propelling means have operated during a predetermined time interval and subsequently causing the specific density of the body to be adjusted to continuous equality with the specific density of the surrounding water.

References Cited in the file of this patent

UNITED STATES PATENTS

| | | |
|---|---|---|
| 1,035,021 | Laubeuf | Aug. 6, 1912 |
| 1,120,621 | Lindmark | Dec. 8, 1914 |
| 1,169,523 | Uhr et al. | Jan. 25, 1916 |
| 1,179,148 | Uhr et al. | Apr. 11, 1916 |
| 1,298,142 | Wrightson | Mar. 25, 1919 |

FOREIGN PATENTS

| | | |
|---|---|---|
| 2,476 | Great Britain | 1912 |
| 16,861 | Great Britain | of 1915 |